US012611641B2

(12) United States Patent
Schoeck et al.

(10) Patent No.: US 12,611,641 B2
(45) Date of Patent: Apr. 28, 2026

(54) STATIC MIXER

(71) Applicant: medmix Switzerland AG, Haag (CH)

(72) Inventors: Joachim Schoeck, Winterthur (CH); Christoph Streit, Haag (CH)

(73) Assignee: medmix Switzerland AG, Haag (CH)

( * ) Notice: Subject to any disclaimer, the term of this patent is extended or adjusted under 35 U.S.C. 154(b) by 536 days.

(21) Appl. No.: 18/026,800

(22) PCT Filed: Aug. 31, 2021

(86) PCT No.: PCT/EP2021/074042
§ 371 (c)(1),
(2) Date: Mar. 16, 2023

(87) PCT Pub. No.: WO2022/058162
PCT Pub. Date: Mar. 24, 2022

(65) Prior Publication Data
US 2023/0321615 A1      Oct. 12, 2023

(30) Foreign Application Priority Data
Sep. 17, 2020    (EP) .................................... 20196671

(51) Int. Cl.
*B01F 25/00*      (2022.01)
*B01F 25/432*      (2022.01)
*B33Y 80/00*      (2015.01)

(52) U.S. Cl.
CPC ........... *B01F 25/4323* (2022.01); *B33Y 80/00* (2014.12)

(58) Field of Classification Search
CPC .. B01F 25/4323; B01F 33/503; B01F 33/409; B01F 25/424; B33Y 80/00
See application file for complete search history.

(56) References Cited

U.S. PATENT DOCUMENTS 4,027,857 A      6/1977   Cunningham
4,971,450 A  *  11/1990   Gerich .................. B01F 25/432
                                                                 366/340

(Continued)

FOREIGN PATENT DOCUMENTS

CN        109876688 A      6/2019
CN        110681298 A      1/2020

(Continued)

OTHER PUBLICATIONS

European Search Report of corresponding EP Application No. 20196671.0-1017 dated Mar. 16, 2021.

(Continued)

*Primary Examiner* — Anshu Bhatia
(74) *Attorney, Agent, or Firm* — Spencer Fane, LLP

(57) ABSTRACT

A static mixer includes two or more mixing segments, each mixing segment including an inlet section, an outlet section oppositely disposed to the inlet section, a longitudinal axis defined between the inlet section and the outlet section, a plurality of mixing passages and a common distributor connected to each of the plurality of mixing passages of the mixing segment. The common distributor is arranged at the inlet section. Furthermore, inlets of the passages of the mixing segments form an inlet arrangement at the distributor of the corresponding mixing segment and outlets of the passages of the individual mixing segments form an outlet arrangement at the outlet section of the corresponding mixing segment. Thereby, the outlet arrangement is different from the inlet arrangement.

19 Claims, 25 Drawing Sheets

(56)                    References Cited

U.S. PATENT DOCUMENTS

2010/0290307 A1 * 11/2010 Gordon .............. B01F 25/4521
                                                    366/104
2020/0346176 A1 * 11/2020 Schoeck .............. B05B 7/0408

FOREIGN PATENT DOCUMENTS

| EP | 1825906 | A1 | 8/2007 |
|----|---------|----|--------|
| FR | 2355556 | A1 | 1/1978 |
| GB | 1423933 | A  | 2/1976 |
| SU | 1592021 | A1 | 9/1990 |

OTHER PUBLICATIONS

First Office Action received for Chinese Application No. 202180063650.
9, mailed on Apr. 9, 2025, 17 pages. (English Translation Submitted).

* cited by examiner

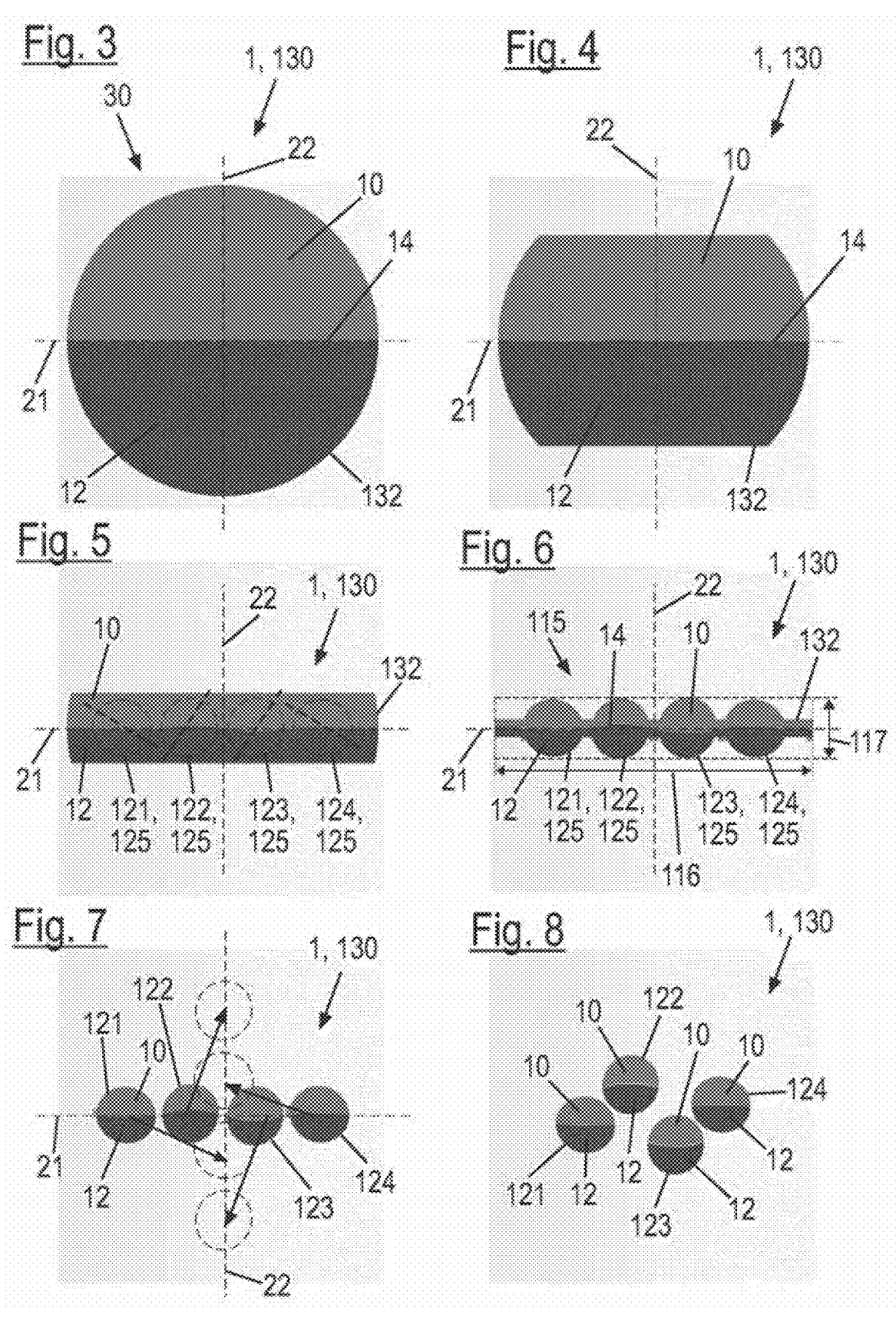

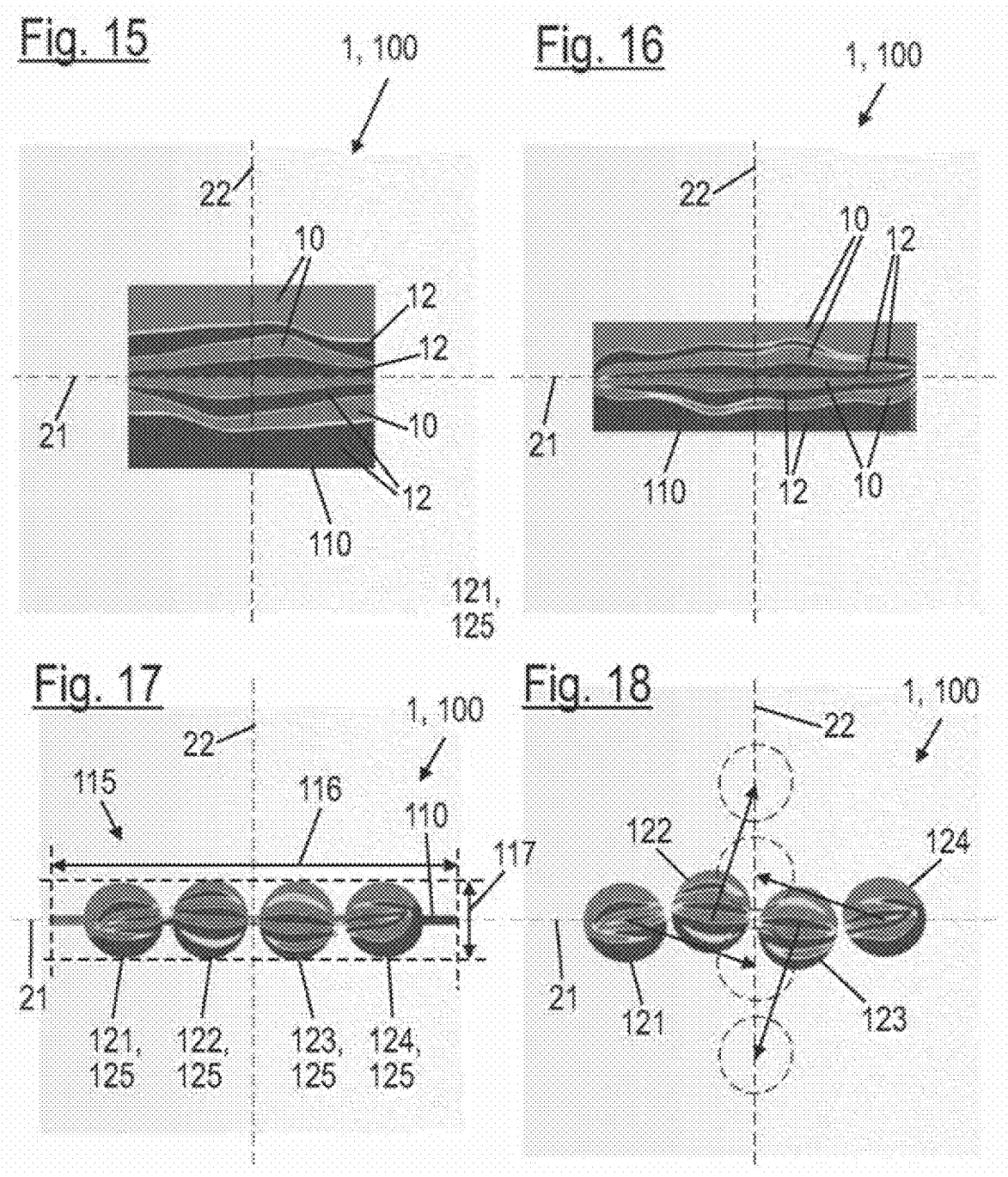

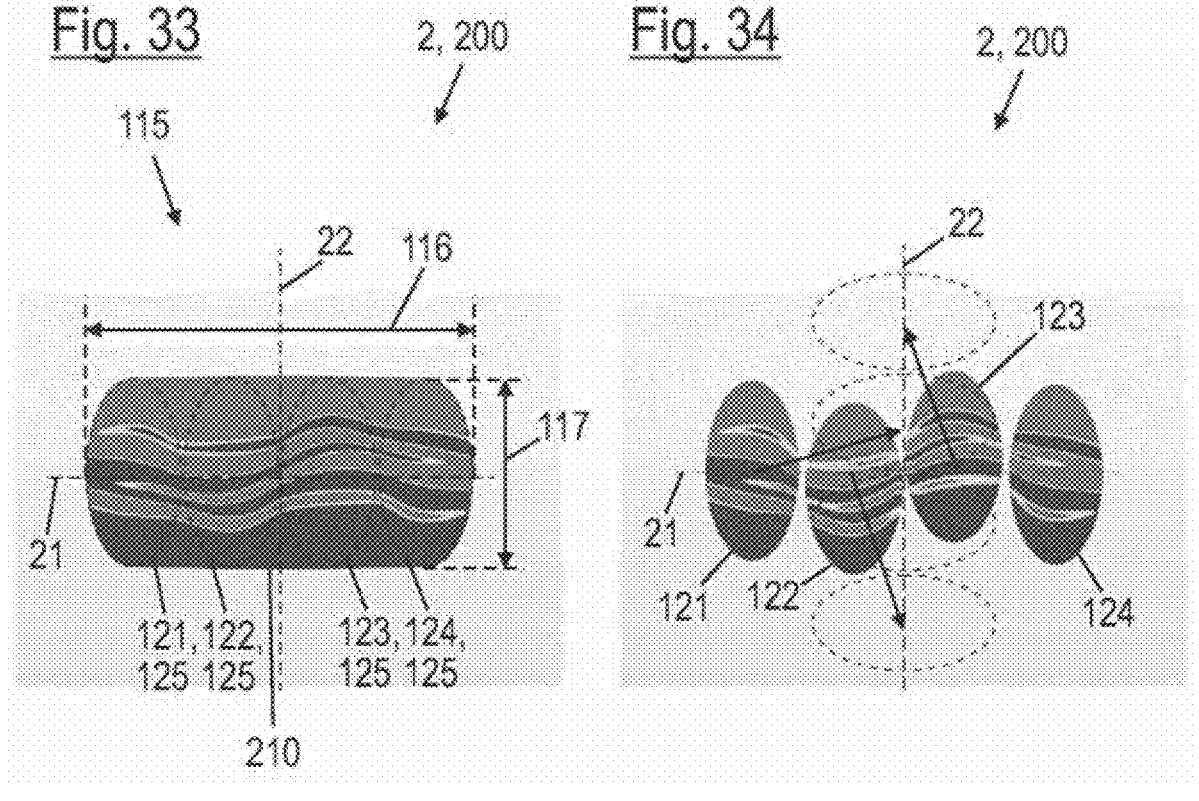

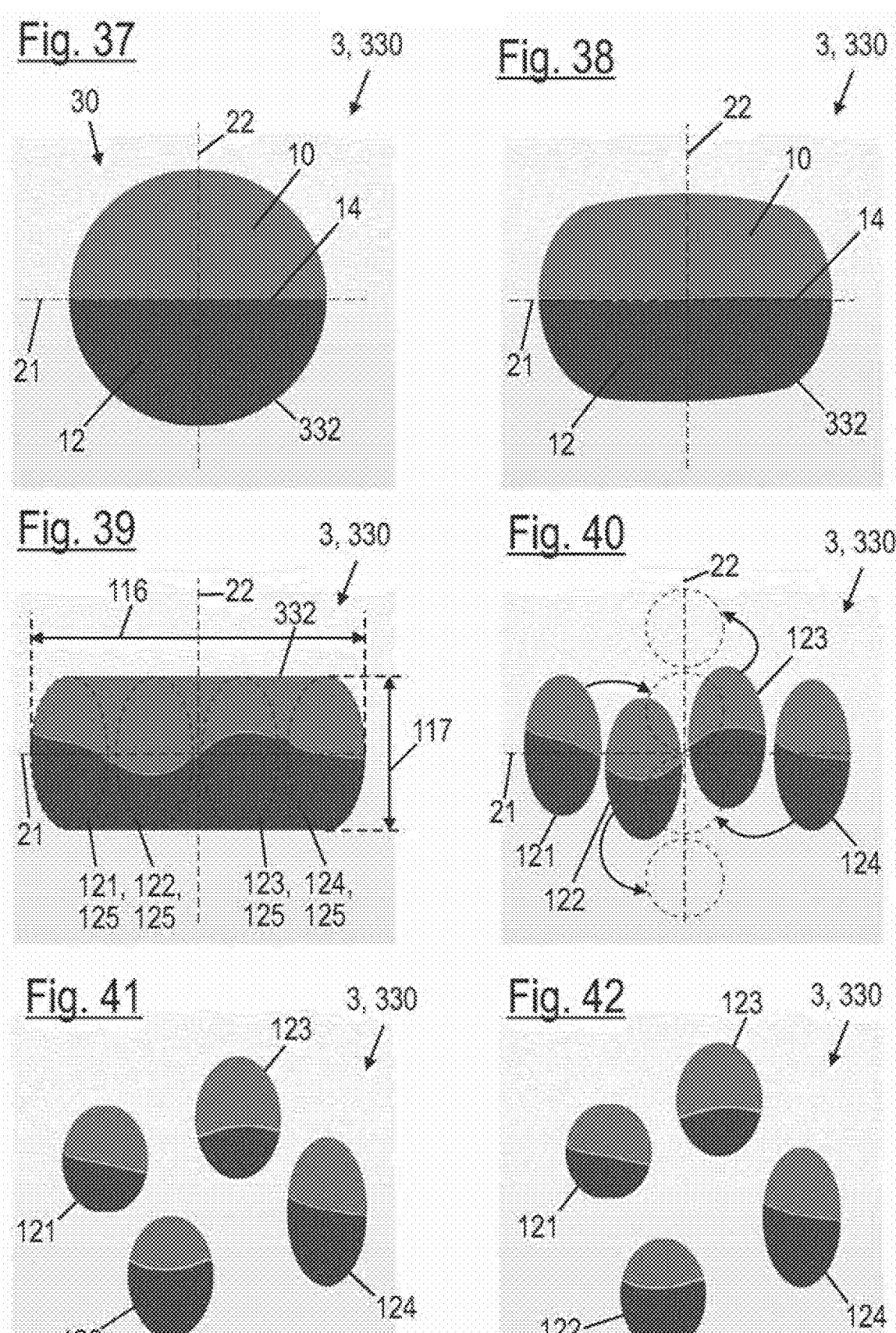

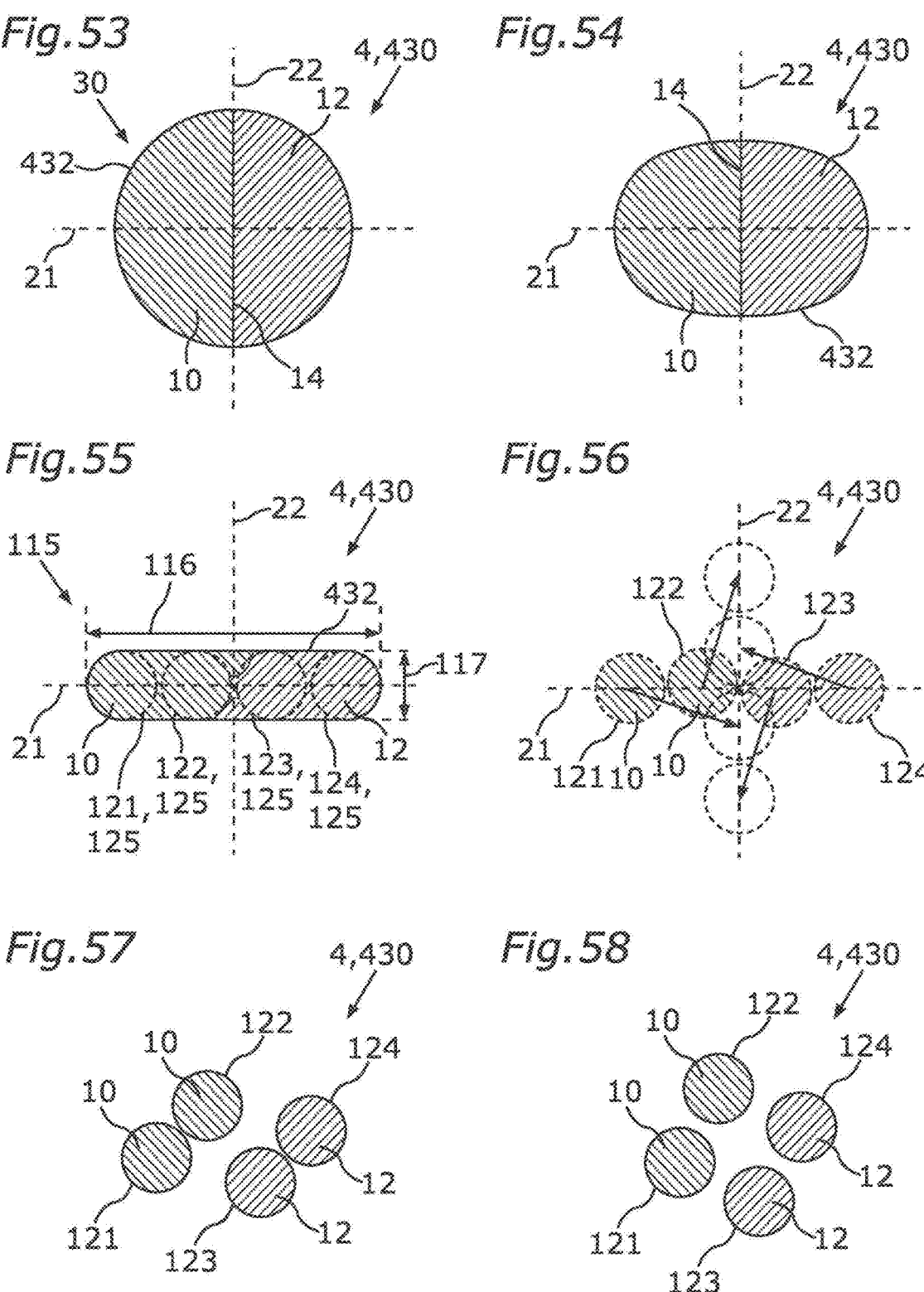

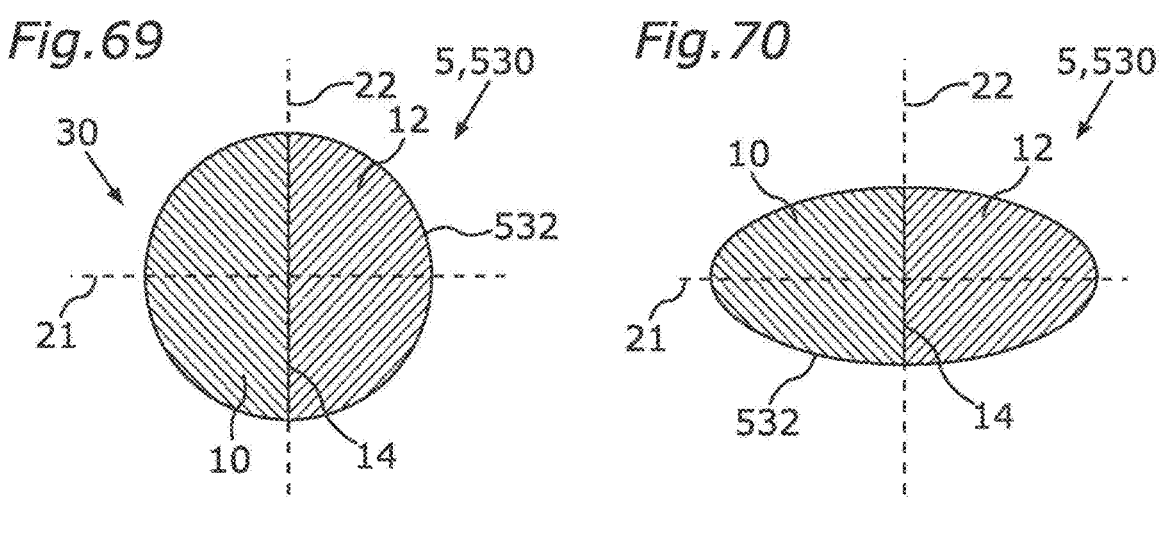
Fig.69
Fig.70
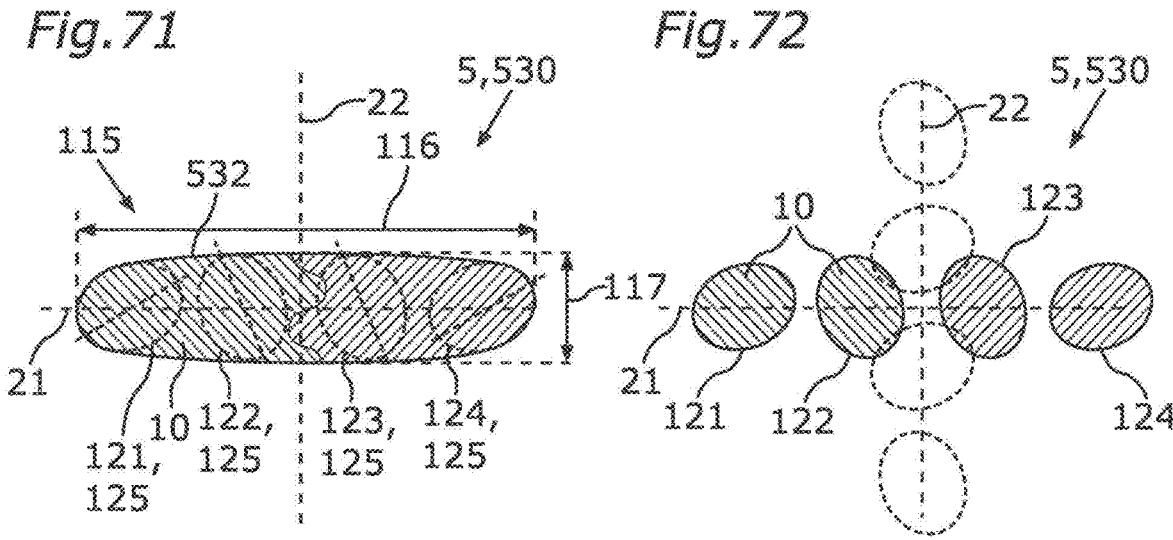
Fig.71
Fig.72
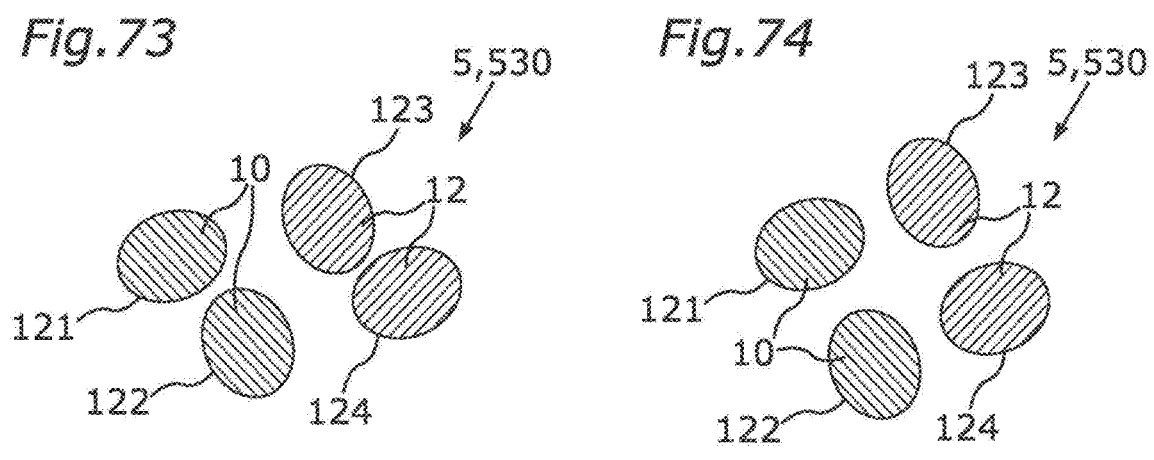
Fig.73
Fig.74

STATIC MIXER

CROSS-REFERENCE TO RELATED APPLICATION

This application is a U.S. National Stage Application of International Application No. PCT/EP2021/074042, filed Aug. 31, 2021, which claims priority to European Application No. 20196671.0, filed Sep. 17, 2020, the contents of each of which are hereby incorporated by reference.

BACKGROUND

Technical Field

The present disclosure relates to a static mixer having two, three or more mixing segments.

Background Information

Conventional statis mixers can be employed to mix individual components of multi-component materials, such as adhesives, dental material or the like, prior to application. Usually, high and/or low viscosity materials are thereby mixed in laminar flow. After mixing, the mixture usually cures due to chemical reactions and hardens thereupon. The physical and chemical properties of the cured material usually depend on the homogeneity of the mixture produced by the static mixer and improve with increasing homogeneity.

Static mixers comprise only fixed elements that do not move with respect to each other. Mixing is usually achieved at intersections that split and combine the material to be mixed. These intersections are usually sequentially located along a longitudinal axis of the static mixer, which can comprise several consecutive mixing segments that are identical in shape, size and/or design, which can either be arranged in parallel to one another or rotated by 90° and/or 180° with respect to one another.

SUMMARY

It has been determined that the homogeneity of the mixed material improves with the number of consecutive intersections along the longitudinal axis, static mixers that homogeneously mix the individual components and/or that are able to mix material components having largely different viscosities may have considerable lengths. This length can limit accessibility in many applications.

Accordingly, there is a need to provide a mixing segment and a static mixer that are configured to homogeneously mix multi-component materials and simultaneously exhibit short length.

The present disclosure provides a static mixer according to the embodiments set forth in the description and the drawings.

In one aspect, the present disclosure is directed at a static mixer comprising two, three or more mixing segments, wherein each mixing segment comprises an inlet section, an outlet section oppositely disposed to the inlet section, a longitudinal axis defined between the inlet section and the outlet section, a plurality of mixing passages and a common distributor connected to each of the plurality of mixing passages of said mixing segment. The common distributor is arranged at the inlet section. Furthermore, inlets of the passages of the individual mixing segments form an inlet arrangement at the distributor of the corresponding mixing segment and outlets of the passages of the individual mixing segments form an outlet arrangement at the outlet section of the corresponding mixing segment. Thereby, the outlet arrangement is different from the inlet arrangement.

Due to the outlet arrangement being different from the inlet arrangement, the passages of the individual mixing segments become rearranged in between the common distributor and the outlet section of their respective mixing segment. This allows for efficient mixing in the common distributor of the following mixing segment. The common distributor can thereby be configured to distribute individual material portions of the mixing material that are received at its inlet from the individual passages of the preceding mixing segment over all passages at the inlet arrangement of the following passages. For example, the distributor can distribute the mixing material in a way that every passage connected to the distributor at the inlet arrangement receives material portions from every passage of the preceding segment. The distributor of a given mixing segment can therefore redistribute the material portions received from the individual passages of the preceding segment over all passages of its own mixing segment.

The static mixer comprises an inlet and an outlet that is disposed oppositely to the inlet along the longitudinal axis. A flow direction of the mixing material is then defined from the inlet to the outlet. The individual mixing segments of the static mixer are arranged one after the other along the longitudinal axis. Thereby, neighboring mixing segments are joined with each other via the outlet section of the preceding mixing segment and the inlet section of the following mixing segment. For example, the outlet section of a preceding mixing segment can be directly connected to the inlet section of a following mixing segment. For example, all neighboring mixing segments can be directly connected with each other by directly joining the outlet sections of preceding mixing segments to the inlet sections of following mixing segments.

The outlet sections of the individual mixing segments can be formed by the outlets of the mixing passages of the respective mixing segment and the inlet sections of the individual mixing segments can be formed by the inlets of the common distributor of the respective mixing segment so that the outlets of the passages of every preceding mixing segment are directly joined to the inlets of the common distributor of the respective following mixing segment. Alternatively, the outlet section of one or all preceding mixing segments can also be connected via at least one further type of mixing segment to the inlet sections of the following mixing segment.

The individual common distributors of the mixing segments can have inlets that are arranged in an arrangement that corresponds to the outlet arrangement of the outlets of the mixing passages. Additionally or alternatively, the individual common distributors can have outlets that are arranged in an arrangement that corresponds to the inlet arrangement of the inlets of the mixing passages.

The outlet arrangement can differ from the inlet arrangement in that outlets of individual passages have a different absolute position and/or relative position and/or shape and/or orientation and/or order in the outlet arrangement than the corresponding inlets of the respective passages have in the inlet arrangement. The shapes of the individual passages can form an inlet pattern in the inlet arrangement and the shapes of the individual passages can form an outlet pattern in the outlet arrangement. The outlet pattern can correspond to a rotated version of the inlet pattern. Alternatively, the outlet pattern can deviate from the inlet pattern. In connection with the present disclosure, the inlet pattern and the outlet pattern are defined by the relative arrangement and orientation of the individual shapes of the mixing passages, irrespective of any association of the individual shapes to the individual mixing passages.

The relative positions of the individual passages within the outlet arrangement can be different from the relative positions of the individual passages within the inlet arrangement so that the individual passages are redistributed between their inlets and outlets. Alternatively, the individual passages can have the same relative position in the inlet and outlet arrangement.

The static mixer can be configured to mix a mixing material that comprises at least two material components. The mixing material can be a viscous material that exhibits a laminar flow within the mixing segments.

The static mixer can receive the mixing material at an inlet segment that is located at the inlet of the static mixer and can eject the mixing material via an outlet segment that is located at the outlet of the static mixer. The inlet segment can be configured to receive the unmixed material components via a single opening or via separate openings, for example via one opening for each material component. The openings can be circular. The inlet segment can be configured to distribute the material components over the inlets of the following first mixing segment of the static mixer. For example, the inlet segment can comprise individual mixing passages that guide the material components to the inlets of the first mixing segment.

The inlet segment can be configured to guide all mixing components to every inlet of the first mixing segment. Alternatively, the inlet segment can be configured to essentially guide only single mixing components to the individual inlets of the first mixing segment so that every inlet of the first mixing segment essentially receives a single mixing component. Thereby, at every inlet of the first mixing segment, an admixture of further mixing components to the respective single mixing component can be at most 10%, for example at most 1% or at most 0.5%.

The outlet segment can be configured to eject the mixed material components via a single opening, for example via a circular opening. The outlet segment can receive the mixing material from a last mixing segment of the static mixer, for example directly from the last mixing segment. The individual passages of the last mixing segment can be directly joined to the outlet segment. For example, the outlet segment can have one inlet for every mixing passage of the last mixing segment. The outlet segment can comprise a single outlet collector that receives the mixing material from the mixing passages of the last mixing segment and ejects the mixing material via the outlet of the static mixer.

The individual mixing segments of the static mixer can each be integrally formed from a single material and connected to one another as one piece. The material of the mixing segments can be a photopolymer, such as Photo-Resins X004M or UltraCur3D ST45, both offered by BASF 3D Printing Solutions GmbH, Heidelberg, Germany. Alternatively, the material can also be a ceramic or a metal material.

The mixing segments and/or the inlet segments and/or the outlet segment of the static mixer can have been produced by additive manufacturing. They can therefore exhibit a surface structure with inhomogeneities that stem from placing multiple material layers above each other. The material layers can be orientated perpendicular or parallel to the longitudinal axis. Additive manufacturing can include material extrusion, material jetting, powder bed fusion, vat photopolymerization, or the like.

For example, the mixing segments can have been additively manufactured from a liquid resin, such as a liquid polymer, for example a liquid photopolymer. Mixing segments manufactured from liquid resins can be easily cleaned after manufacturing from non-reacted raw material. Furthermore, liquid-resin-based manufacturing permits the formation of filigree components.

Each mixing passage of the individual mixing segments can be closed along a length thereof. For example, each mixing passage can be configured as a tube. The individual mixing passages can be configured as separate tubes that are spaced apart from each other. Thereby, the walls of the individual mixing passages can be separated from the walls of all other mixing passages. The mixing segments can comprise clearances in between the individual passages that separate the passages from each other.

At least a part of the mixing passages or all mixing passages can comprise an inner wall that divides the respective passage into two subpassages that directly adjoin the inner wall. The inner wall can be helical. Inner walls within the individual passages can improve mixing of the mixing material within the passages.

The individual mixing passages can be straight and/or tilted with respect to the longitudinal axis. Alternatively, the individual mixing passages can be bent.

The individual common distributors can have a flat inlet surface and/or a flat outlet surface. The inlet surface and/or the outlet surface can be orientated perpendicular to the longitudinal axis. Within the inlet surface, the common distributors can have inlets for connection to the mixing passages of a preceding segment of the static mixer. Within the outlet surface, the common distributors can have outlets for connection to the mixing passages of its own mixing segment. Such flat inlet and/or outlet surface allow for stable connections between the distributor and adjacent passages.

According to an embodiment, a ratio of a length of the distributor of at least one mixing segment along the longitudinal axis to a maximum extent of the distributor perpendicular to the longitudinal axis is selected in the range of 0.1 to 0.6. By keeping the length of the distributor shorter than its maximum extent perpendicular to the longitudinal axis, the static mixer can be comparably compact along the longitudinal axis. A minimum ratio of 0.1 additionally allows for homogeneous mixing within the common distributor. A diameter of the common distributor can be defined as its maximum extent perpendicular to the longitudinal axis over its entire length. For example, with all mixing segments of the static mixer, a ratio of the length of the distributors of the individual mixing segments along the longitudinal axis to the maximum extent of the individual distributors perpendicular to the longitudinal axis can be selected in the range of 0.1 to 0.6

According to an embodiment, a ratio of the length of the distributor of at least one mixing segment to a length of each passage along the longitudinal axis is selected in the range of 0.6 to 1.5. Therefore, the mixing passages have essentially the same length as the distributor along the longitudinal axis and the entire static mixer can have compact dimensions along the longitudinal axis. For example, with all mixing segments of the static mixer, a ratio of the length of the distributors of the individual mixing segments to a length of each passage of the corresponding mixing segment along the longitudinal axis is selected in the range of 0.6 to 1.5

According to an embodiment, the inlets of the passages are arranged in an inlet sequence parallel to a first transverse axis within the inlet arrangement and the outlets of the passages are arranged in an outlet sequence parallel to a second transverse axis within the outlet arrangement. Thereby, the second transverse axis is different from the first transverse axis, preferably perpendicular to the first transverse axis.

By rotating the direction along which the outlets of the mixing passages are arranged with respect to the direction of the alignment of their inlets, mixing of the material components within the distributors in between the mixing passages of consecutive mixing elements can be based on a realignment of the mixing material from the second transverse axis to the first transverse axis within the common distributor.

If the second transverse axis is perpendicular the first transverse axis, wall segments of neighboring passages that face each other at the passage outlets are arranged at opposite sides of their respective passages at the passage inlets and therefore at opposite sides of the common distributor perpendicular to the first transverse axis and parallel to the second transverse axis. This results in a mixing segment with a high mixing efficiency.

The inlets can be aligned with the first transverse axis or they can exhibit individual shifts with respect to the first transverse axis. Likewise, the outlets can be aligned with the second transverse axis or they can exhibit individual shifts with respect to the second transverse axis.

In alternative embodiments, the first transverse axis can also be parallel to the second transverse axis. Within these embodiments, the inlet arrangement can, for example, differ from the outlet arrangement by the order of the individual passages within the inlet and outlet sequences.

In general and irrespective of their orientation, the outlet sequence can be different from the inlet sequence. For example, passages that are arranged next to each other within the inlet sequence can be separated by at least one additional passage within the outlet sequence.

According to an embodiment, the outlet sequence is a non-identical permutation of the inlet sequence, preferably an alternating permutation and/or a derangement. The outlet sequence being a non-identical permutation of the inlet sequence means that the outlets of the individual passages in the outlet sequence are arranged in a different order than the inlets of the respective passages are arranged in the inlet sequence.

In the case of an alternating permutation, the neighboring passages of every passage in the inlet sequence are both placed on the same side of the respective passage in the outlet sequence. In the case of a derangement, the relative position of every passage within the outlet sequence is different from its relative position within the inlet sequence, so that none of the outlets of the individual passages appears on the same position within the outlet sequence as the inlet of the corresponding passage appears in the inlet sequence. Such permutations yield high mixing efficiency.

According to an embodiment, the outlet sequence alternately comprises outlets of passages having inlets within a first half of the inlet sequence and outlets of passages having inlets within a second half of the inlet sequence. Such a rearrangement also contributes to a high mixing efficiency.

For example, the mixing segments can comprise four mixing passages in total, whereby the inlets of a first, second, third and fourth mixing passage are sequentially arranged within the inlet sequence. The outlet sequence would then alternately comprise one of the outlets of the first and second mixing passages and one of the outlets of the third and fourth mixing passages.

According to an embodiment, the distributor has an inlet and an outlet that is located opposite from the inlet along the longitudinal axis. Furthermore, the distributor has an inlet cross-section at the inlet that has an elongated inlet shape with an orientation parallel to a first transverse axis and an outlet cross-section at the outlet that has an elongated outlet shape with an orientation parallel to a second transverse axis, wherein the first transverse axis is different from the second transverse axis, preferably perpendicular to the second transverse axis. The inlet and outlet cross-sections of the distributor having different orientations contributes to an efficient mixing of the material components within the common distributor.

The elongated inlet shape has a length parallel to the first transverse axis that is larger than its width perpendicular to the first transverse axis and the elongated outlet shape has a length parallel to the second transverse axis that is larger than its width perpendicular to the second transverse axis. The first transverse axis, parallel to which the inlet shape of the distributor is orientated, can correspond to the first transverse axis, parallel to which the inlet sequence of the mixing passages is aligned. Likewise, the second transverse axis, along which the outlet shape of the distributor is orientated, can correspond to the second transverse axis, along which the outlet sequence of the mixing passages is aligned.

In general, the inlet shape and/or the outlet shape can be symmetrical with respect to the first and/or second transverse axis.

According to an embodiment, the inlet cross-section has an inlet length parallel to the first transverse axis and an inlet width perpendicular to the first transverse axis and the outlet cross-section has an outlet length parallel to the second transverse axis and an outlet width perpendicular to the second transverse axis. Thereby the inlet length equals the outlet length and/or the inlet width equals the outlet width.

According to an embodiment, the inlet shape and the outlet shape are identical and have a different orientation within a transverse plane perpendicular to the longitudinal axis. The outlet shape therefore equals the inlet shape upon rotation around the longitudinal axis. For example, the outlet shape can equal the inlet shape rotated by 90° around the longitudinal axis. Such shapes allow for homogeneous mixing of the mixing components within the individual mixing segments and additionally provide a constant flow velocity within the common distributor.

According to an embodiment, a cross-section of the distributor perpendicular to the longitudinal axis transforms from the inlet shape via an intermediate shape at an intermediate longitudinal position in between the inlet and the outlet to the outlet shape, wherein the intermediate shape is different from the inlet shape and/or the outlet shape. Such a transformation leads to efficient mixing of the material components, for example with material components exhibiting laminar flow within the static mixer. The intermediate shape thereby is defined by a cross-sectional shape of the common distributor perpendicular to the longitudinal axis at the intermediate longitudinal position in between the inlet and the outlet of the common distributor.

The extent of the cross-section of the distributor parallel to the first longitudinal axis can continuously, for example linearly decrease from the extent of the inlet cross-section parallel to the first transverse axis to the extent of the outlet cross-section parallel to the first transverse axis, for example from the inlet length to the outlet width. Likewise, the extent of the cross-section of the distributor parallel to the second longitudinal axis can continuously, for example linearly, increase from the extent of the inlet cross-section parallel to the second longitudinal axis to the extent of the outlet cross-section parallel to the second longitudinal axis, for example from the inlet width to the outlet length.

According to an embodiment, a cross-sectional shape of each of the passages perpendicular to the longitudinal axis of the mixing segments or perpendicular to the respective axes of the individual passages is circular at at least one position along their longitudinal extent, preferably over their entire longitudinal extent. Circular cross-sections of the individual passages inhibit a rearrangement or rotation of different transversely arranged material portions within the individual passages and thus enhance the mixing action of the common distributor.

According to an embodiment, a cross-sectional shape of each of the passages perpendicular to the longitudinal axis of the mixing segments or perpendicular to the respective axes of the individual passages is non-circular, preferably oval, at at least one position along their longitudinal extent, preferably over their entire longitudinal extent. An oval shape according to the present disclosure is defined as a shape having a closed, convex, non-intersecting and smooth (differentiable) outer boundary.

According to an embodiment, a cross-sectional shape of each of the passages of the plurality of passages is constant over their longitudinal extent. This essentially limits the mixing action of the individual mixing segments to a possible rearrangement of the mixing passages in between the common distributors of the individual mixing segments and to mixing within the common distributors. Therefore, the mixing segment exhibits well-defined mixing characteristics.

According to an embodiment, a cross-sectional shape of each of the passages of the plurality of passages varies over their longitudinal extent. Such variation provides further mixing action within the individual passages.

For example, the cross-sectional shape of the longitudinal passages perpendicular to the longitudinal axis can transform over the longitudinal extent of the individual passages from an inlet shape via an intermediate shape to an outlet shape, the intermediate shape being different from the inlet shape and/or the outlet shape. For example, an extent of the individual passages parallel to the first transverse axis and/or parallel to the second transverse axis can continuously change from their corresponding extent within the inlet arrangement to their corresponding extent within the outlet arrangement.

According to an embodiment, a cross-sectional area of each of the passages of the plurality of passages is constant over their longitudinal extent. This ensures a continuous flow velocity within the individual passages. The cross-sections of constant areas thereby can be orientated perpendicular to the longitudinal axis of the static mixer or perpendicular to the local direction of the mixing passages.

According to an embodiment, each mixing segment comprises three, four or more passages. The inlets of these passages can then be arranged in the inlet sequence parallel to the first transverse axis and the outlets of these passages can then be arranged in the outlet sequence parallel to the second transverse axis. In the case of four passages, the outlet sequence can comprise the two outer passages of the inlet sequence in between the two inner passages of the inlet sequence and the two inner passages of the inlet sequence can form the two outer passages of the outlet sequence.

With four mixing passages, the outer passages can have the same shape in the inlet arrangement and/or in the outlet arrangement. Additionally or alternatively, the inner passages can have the same shape in the inlet arrangement and/or in the outlet arrangement. For example, all passages can have the same shape in the inlet and/or in the outlet arrangement. An orientation of the shapes of the inner passages can be different from, for example perpendicular to, an orientation of the shapes of the outer passages within the inlet arrangement and/or within the outlet arrangement.

In another aspect, the present disclosure is directed at a method for manufacturing a static mixer according to the present disclosure, wherein the mixing segments are formed by sequentially placing material layers forming the mixing segments in cross-sectional planes of the mixing segments. The cross-sectional planes can be orientated perpendicular or parallel to the longitudinal axis. The mixing segments are thus fabricated by additive manufacturing in cross-sectional planes that can be orientated perpendicular or parallel to the longitudinal axis. Additive manufacturing can include material extrusion, material jetting, powder bed fusion, vat photopolymerization, or the like.

BRIEF DESCRIPTION OF THE DRAWINGS

Embodiments of the disclosure will be explained in more detail with reference to the drawings.

FIG. 3 illustrates a cross-section of the first static mixer at its inlet;

FIGS. 4 to 18 illustrate further cross-sections of the first static mixer at consecutive positions along its longitudinal axis:

FIGS. 22 to 34 illustrate further cross-sections of the second static mixer at consecutive positions along its longitudinal axis:

FIG. 37 illustrates a cross-section of the third static mixer at its inlet:

FIGS. 38 to 50 illustrate further cross-sections of the third static mixer at consecutive positions along its longitudinal axis:

FIG. 53 illustrates a cross-section of the fourth static mixer at its inlet:

FIGS. 54 to 66 illustrate further cross-sections of the fourth static mixer at consecutive positions along its longitudinal axis;

FIG. 69 illustrates a cross-section of the fifth static mixer at its inlet;

FIGS. 70 to 82 illustrate further cross-sections of the fifth static mixer at consecutive positions along its longitudinal axis.

DETAILED DESCRIPTION

Figure 1:
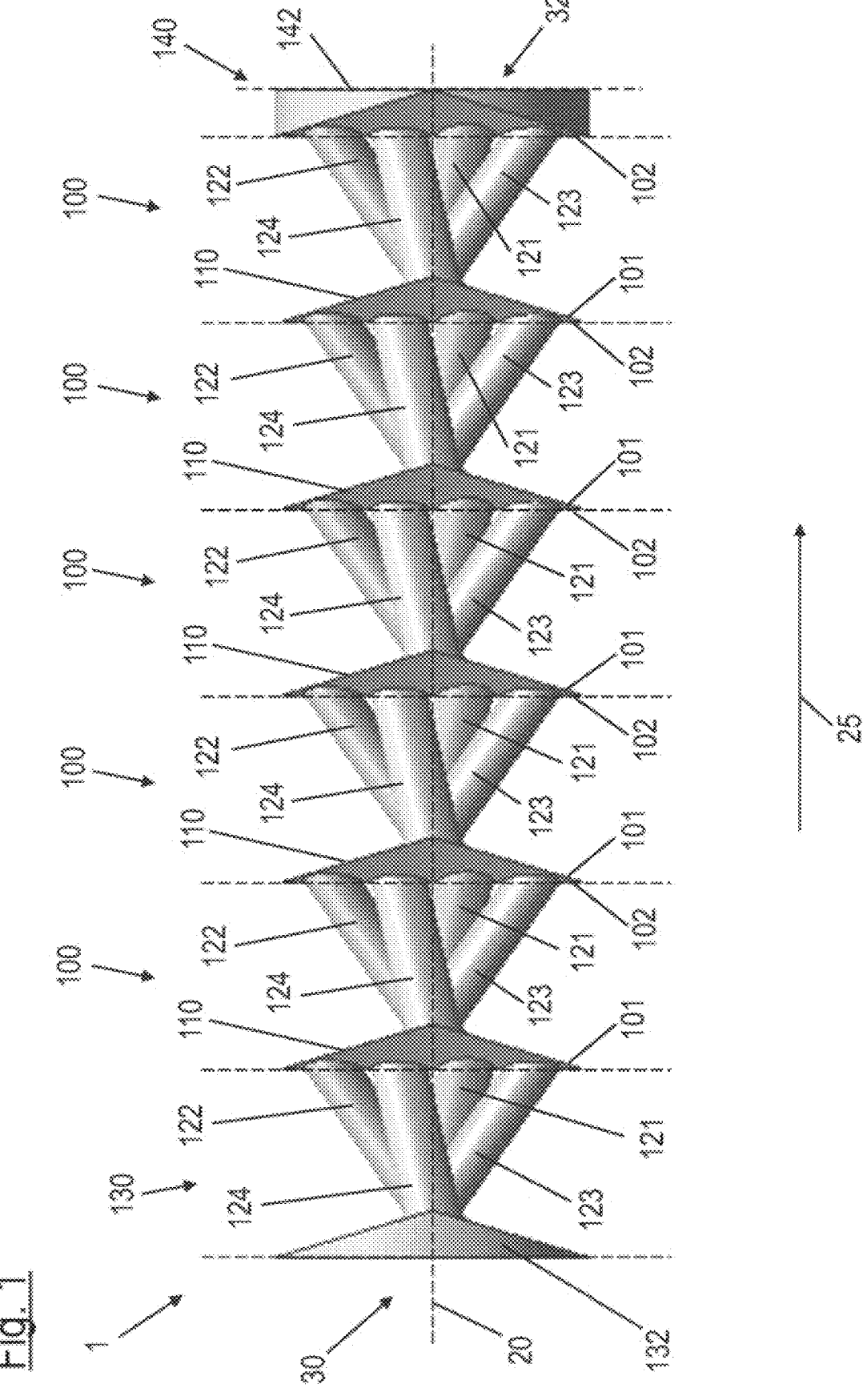
FIG. 1 illustrates a first static mixer according to the present disclosure.

FIG. 1 depicts a first static mixer 1 according to the present disclosure. The first static mixer 1 has a longitudinal axis 20, along which an inlet segment 130, five mixing segments 100 and an outlet segment 140 are sequentially arranged in a flow direction 25.

The individual mixing segments 100 in between the inlet segment 130 and the outlet segment 140 are configured identically. Each mixing segment 100 has an inlet section 101 and an outlet section 102. With neighboring mixing segments 100, the outlet section 102 of the preceding mixing segment 100 is directly joined to the inlet section 101 of the following mixing segment 100 in the flow direction 25. Each mixing segment 100 has a common distributor 110, which is placed at the inlet section 101 of the respective mixing segment 100. The distributor 110 of every mixing segment 100 discharges in the flow direction 25 into a first mixing passage 121, a second mixing passage 122, a third mixing passage 123 and a fourth mixing passage 124 of the respective mixing segment 100. At the outlet sections 102 of the individual mixing segments 100, the mixing passages 121, 122, 123, 124 join the common distributor 110 of the following mixing segment 100.

At a circular inlet 30 of the static mixer 1, the inlet segment 130 has an inlet distributor 132 that adjoins at its downstream end in the flow direction 25 a first mixing passage 121, a second mixing passage 122, a third mixing passage 123 and a fourth mixing passage 124 of the inlet segment 130. The mixing passages 121, 122, 123, 124 of the inlet segment 130 are configured in the same way as the mixing passages 121, 122, 123, 124 of the mixing segments 100. In particular, the connection between the inlet distributor 132 and the mixing passages 121, 122, 123, 124 of the inlet segment 130 equals the connection between the common distributors 110 and the mixing passages 121, 122, 123, 124 of the mixing segments 100. The outlets of the mixing passages 121, 122, 123, 124 of the inlet segment 130 are directly connected to the common distributor 110 of the first mixing segment 100 of the static mixer 1.

The outlet segment 140 comprises an outlet collector 142 that is directly connected to the outlets of the mixing passages 121, 122, 123, 124 of the last mixing segment 100 along the flow direction 25. The connection of the mixing passages 121, 122, 123, 124 of the last mixing segment 100 to the outlet collector 142 is configured in the same way as the connection of the mixing passages 121, 122, 123, 124 of the remaining mixing segments 100 to the common distributors 110 of the respective following mixing segments 100. The outlet collector 142 continuously deforms to a circular outlet 32 of the static mixer 1 at its downstream end along the flow direction 25.

Figure 2:
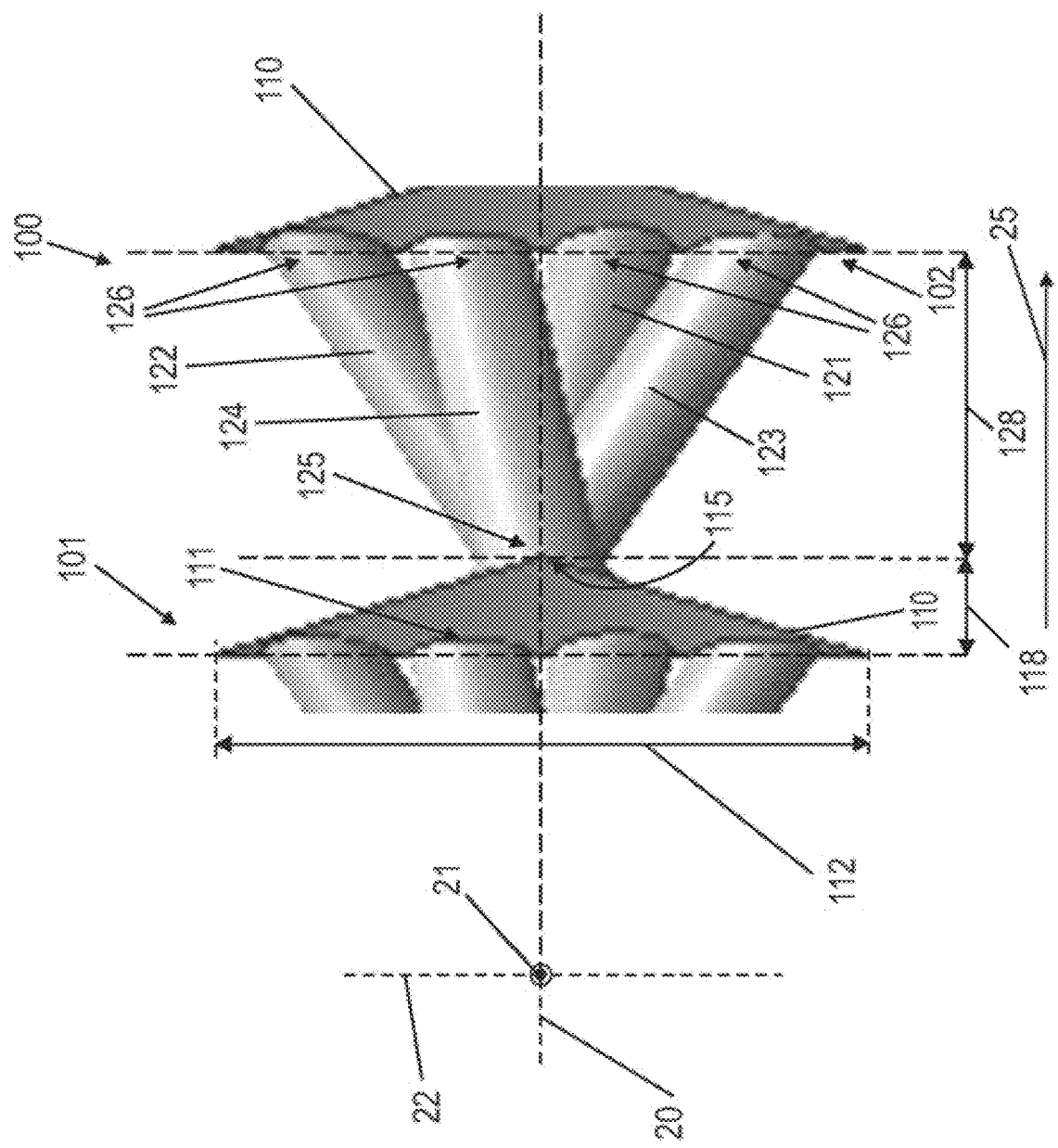
FIG. 2 illustrates a mixing segment of the first static mixer.
Figure 9:
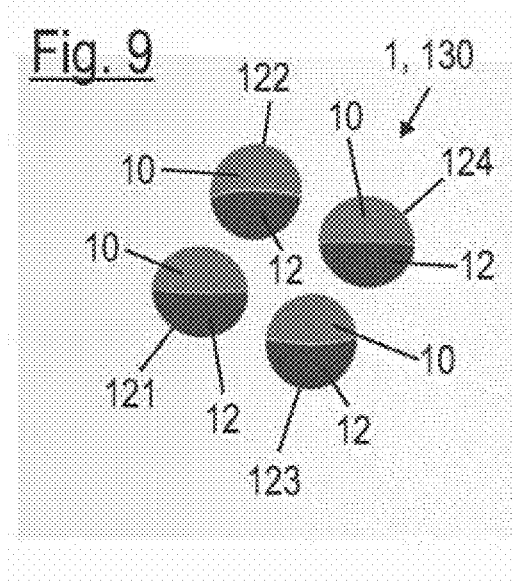
Figure 10:
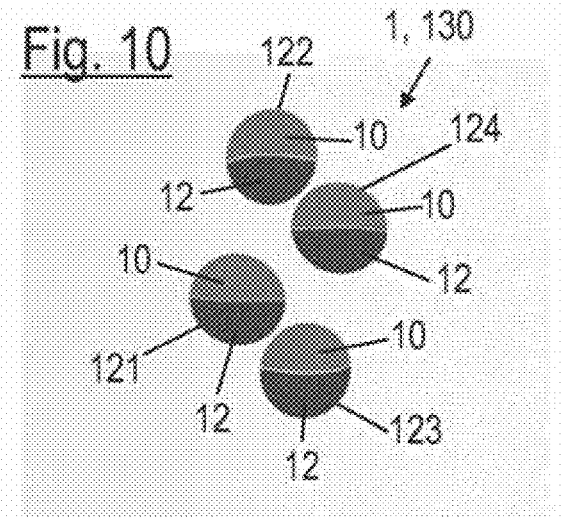
Figure 11:
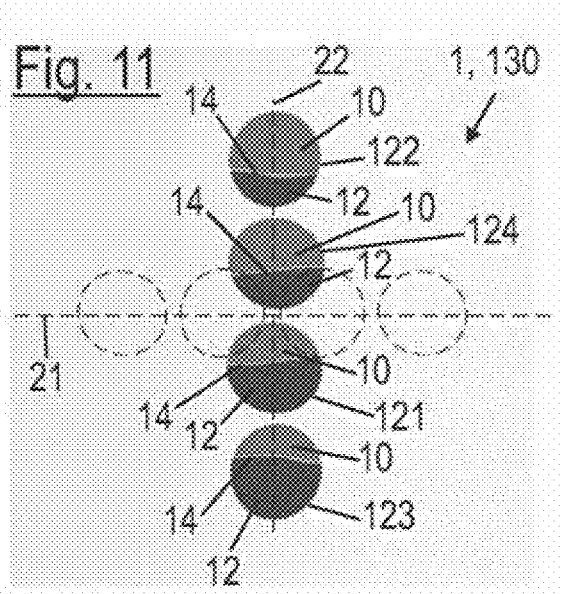

FIG. 2 shows one of the mixing segments 100 of the first static mixer 1. Inlets 125 of the mixing passages 121, 122, 123, 124 are arranged at the distributor 110 parallel to a first transverse axis 21, which is orientated perpendicular to the longitudinal axis 20. Outlets 126 of the mixing passages 121, 122, 123, 124 are arranged parallel to a second transverse axis 22 at the common distributor 110 of the consecutive mixing segment 100, whereby the second transverse axis 22 is orientated perpendicular to the longitudinal axis 20 and perpendicular to the first transverse axis 21.

The mixing passages 121, 122, 123, 124 are configured as straight tubes that are separated from each other by clearances and that are tilted with respect to the longitudinal axis 20. The mixing passages 121, 122, 123, 124 each have a circular cross-section perpendicular to their respective longitudinal direction. Furthermore, the mixing passages 121, 122, 123, 124 are connected in parallel between the distributors 110.

At its inlet 111, the common distributor 110 adjoins the mixing passages of the preceding element 100, 130 of the static mixer 1. At its outlet 115, the common distributor 110 connects to the inlets 125 of the mixing passages 121, 122, 123, 124. An extent of the distributor 110 parallel to the second transverse axis 22 linearly decreases from its inlet 111 towards its outlet 115. Likewise, an extent of the distributor 110 parallel to the first transverse axis 21 linearly increases from the inlet 111 to the outlet 115.

The common distributor 110 has a length 118 along the longitudinal axis 20 and a diameter that corresponds to its maximum extent perpendicular to the longitudinal axis 20 over its longitudinal length 118 between its inlet 111 and its outlet 115. With the first static mixer 1, a length 112 of the distributor 110 along the second transverse axis 22 at its inlet 111 equals a length of the distributor 110 along the first transverse axis 21 at its outlet 115. Therefore, the diameter of the distributor 110 equals the length 112 of the distributor 110 along the second transverse axis 22 at its inlet 111 and its length along the first transverse axis 21 at its outlet 115.

A ratio of the length 118 of the distributor 110 along the longitudinal axis 20 to the diameter of the distributor 110 perpendicular to the longitudinal axis 20 is 0.2. Furthermore, a ratio of the length 118 of the distributor 110 along the longitudinal axis 20 to a longitudinal length 128 of the passages 121, 122, 123, 124 along the longitudinal axis 20 is 0.3.

FIG. 3 shows a cross-section of the inlet distributor 132 perpendicular to the longitudinal axis 20 at the circular inlet 30. The inlet 30 receives a first material component 10 and a second material component 12 of the mixing material, whereby the material components 10, 12 are still unmixed at the inlet 30. The material components 10, 12 fill opposing halves of the inlet 30 and a separating line 14 between the material components 10, 12 is a straight line parallel to the first transverse axis 21.

FIGS. 4 to 6 show cross-sections of the inlet distributor 132 perpendicular to the longitudinal axis 20 at consecutive positions along the flow direction 25. The inlet distributor 132 deforms towards its outlet 115 and its connection to the inlets 125 of the mixing passages 121, 122, 123, 124 of the inlet segment 130. Thereby, an extent of the inlet distributor 132 parallel to the second transverse axis 22 linearly decreases and an extent of the inlet distributor 132 parallel to the first transverse axis 21 stays essentially constant. At its outlet 115, which is shown in FIG. 6, the inlet distributor 132 has a cross-section with an elongated outlet shape that has an orientation parallel to the first transverse axis 21, so that a length 116 of the distributor 132 parallel to the first transverse axis 21 is larger than a width 117 of the distributor 132 parallel to the second transverse axis 22.

FIGS. 5 and 6 show an inlet arrangement of the inlets 125 of the mixing passages 121, 122, 123, 124 at the outlet 115 of the inlet distributor 132. Within the inlet arrangement, the inlets 125 of the first mixing passage 121, of the second mixing passage 122, of the third mixing passage 123 and of the fourth mixing passage 124 are consecutively arranged in an inlet sequence parallel to the first longitudinal axis 21.

Cross-sections of the passages 121, 122, 123, 124 at the individual inlets 125 all have the same oval shape of equal area. The shapes of the outermost passages 121, 124 are orientated parallel to each other and the shapes of the inner passages 122, 123 are also orientated parallel to each other. Furthermore, the shapes of the outermost passages 121, 124 are rotated with respect to the shapes of the inner passages 122, 123. With the first static mixer 1, the shapes of the outermost passages 121, 124 are orientated perpendicular to the shapes of the inner passages 122, 123.

FIGS. 7 to 12 show cross-sections of the inlet segment 130 perpendicular to the longitudinal axis 20 at further consecutive positions along the flow direction 25. As can be seen from FIG. 11 and as it is indicated by dashed lines in FIG. 7, the mixing passages 121, 122, 123, 124 become rearranged with increasing longitudinal positions along the flow direction 25 from their inlet arrangement shown in FIG. 6 to an outlet arrangement shown in FIG. 12.

Figure 12:
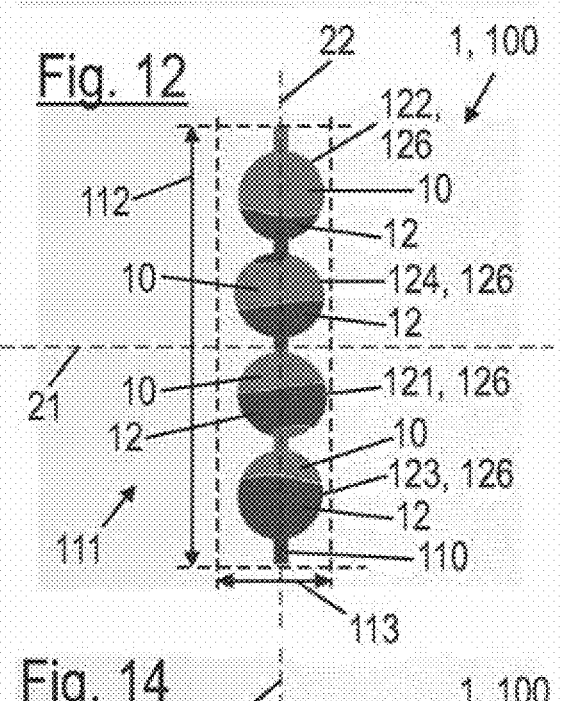
Figure 13:
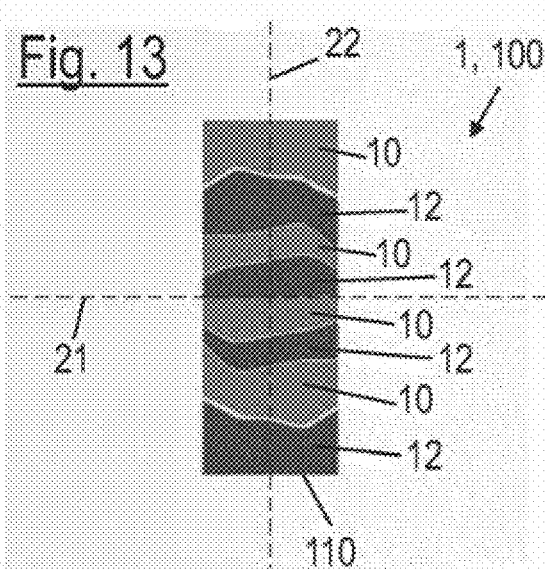
Figure 14:
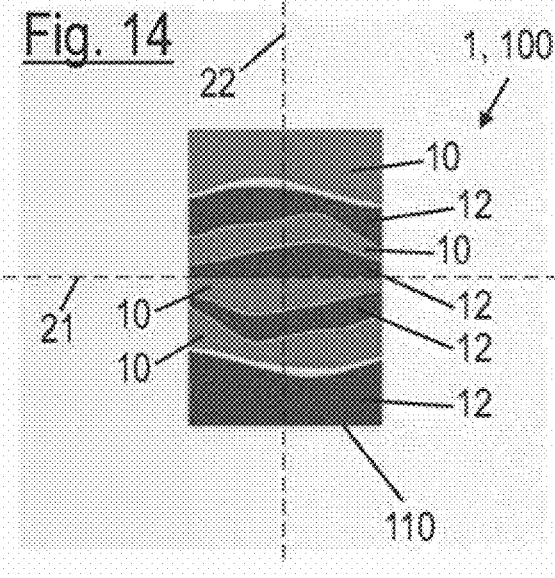

While the passages 121, 122, 123, 124 are positioned in the inlet sequence along the first transverse axis 21 within the inlet arrangement of FIG. 6, they are arranged in an outlet sequence along the second transverse axis 22 within the outlet arrangement of FIG. 12. The outlet sequence consecutively comprises the second mixing passage 122, the fourth mixing passage 124, the first mixing passage 121 and the third mixing passage 123. Therefore, the outlet sequence is a non-identical permutation, namely an alternating permutation and a derangement, of the inlet sequence. Furthermore, an outlet pattern of the outlets 115 of the passages 121, 122, 123, 124 equals an inlet pattern shown in FIG. 6 rotated by 90° around the longitudinal axis 20.

The outlet sequence being a non-identical permutation of the inlet sequence means that the order of the passages 121, 122, 123, 124 along the first transverse axis 21 in the inlet sequence, which sequentially comprises the first passage 121, the second passage 122, the third passage 123 and the fourth passage 124, is different from the order of the passages 121, 122, 123, 124 along the second transverse axis 22 in the outlet sequence, which sequentially comprises the second passage 122, the fourth passage 124, the first passage 121 and the third passage 123.

That the outlet sequence is an alternating permutation of the inlet sequence means that neighboring passages 121, 122, 123, 124 of each passage 121, 122, 123, 124 in the inlet sequence are both placed on the same side of the respective passage 121, 122, 123, 124 in the outlet sequence. For example, the neighboring passages of the second passage 122 in the inlet arrangement shown in FIG. 6, namely the first passage 121 and the third passage 123, are both placed on the same side of the second passage 122 in the outlet arrangement shown in FIG. 12. Similarly, the third passage 123 and the first passage 121, which are to be considered as neighboring passages of the fourth passage 124 in the inlet arrangement shown in FIG. 6, are both placed on the same side of the fourth passage 124 in the outlet arrangement shown in FIG. 12.

That the outlet sequence is a derangement of the inlet sequence means that the relative positions of every passage 121, 122, 123, 124 within the outlet sequence is different from its relative position within the inlet sequence. For example, the second passage 122 is placed at the second relative position within the inlet sequence and at the first relative position within the outlet sequence.

The first half of the inlet sequence consists of the inlets 125 of the first and second passage 121, 122 and the second half of the inlet sequence consists of the inlets 125 of the third and fourth passage 123, 124. The outlet sequence alternately comprises outlets 126 of passages 121, 122, 123, 124 having inlets 125 within the first half of the inlet sequence, namely the outlets 126 of the second and first passage 122, 121, and outlets 126 of passages 121, 122, 123, 124 having inlets 125 within the second half of the inlet sequence, namely the outlets 126 of the fourth and third passage 124, 123.

The shapes of the cross-sections of the mixing passages 121, 122, 123, 124, as well as their absolute orientation remain constant over their entire length 128. Like the inlets 125, the outlets 126 of the mixing passages 121, 122, 123, 124 therefore all have the same oval shape with equal areas. Thereby, the shapes of the outermost passages 122, 123 are arranged parallel to each other and the shapes of the inner passages 121, 124 are also arranged parallel to each other and perpendicular to the shapes of the outermost passages 122, 123.

FIG. 12 shows the connection of the outlets 126 of the passages 121, 122, 123, 124 to the inlet 111 of the common distributor 110 of the first mixing segment 100 of the static mixer 1. The inlet 111 of the common distributor connects all outlets 126 along the second transverse axis 22. It has an elongated shape along the second transverse axis 22, whereby a length 112 along the second transverse axis 22 is smaller than a width 113 along the first transverse axis 21.

As it is shown in FIG. 6, the separating line 14 between the material components 10, 12 essentially runs parallel to the first transverse axis 21 and the inlet sequence and is centered with the passages 121, 122, 123, 124 along the second transverse axis 22. Therefore, each mixing passage 121, 122, 123, 124 receives approximately the same amount of the first material component 10 and the second material component 12. This means, that the relative amount of the first material component 10 and the relative amount of the second material component 12, which the individual passages 121, 122, 123, 124 receive, lie in the range between 30% and 70%.

As can be seen from FIG. 7, the first and second material component 10, 12 are stacked along the second transverse axis 22 within the individual passages 121, 122, 123, 124. During rearrangement of the passages 121, 122, 123, 124, this stacking remains essentially constant so that, in the outlet arrangement shown in FIG. 12, neighboring passages 121, 122, 133, 124 contain different material components 10, 12 in facing sections of their cross-sectional areas.

FIGS. 12 to 17 show cross-sections of the common distributor 110 perpendicular to the longitudinal axis 20 at consecutive positions along the flow direction 25. The cross-section of the common distributor 110 continuously deforms from its inlet shape shown in FIG. 12 via intermediate shapes at the intermediate longitudinal positions shown in FIGS. 13 to 16 into its outlet shape shown in FIG. 17. Thereby, the extent of the cross-section of the common distributor 110 along the second transverse axis 22 linearly decreases from its length 112 at the inlet 111 to a width 117 at the outlet 115 and an extent of the common distributor 110 along the first transverse axis 21 linearly increases from its width 113 at the inlet 111 to a length 116 at the outlet 115.

As it is shown in FIG. 12, the inlet shape of the common distributor 110 is elongated with an orientation parallel to the second transverse axis 22, since its length 112 along the second transverse axis 22 is larger than its width 113 along the first transverse axis 21. Likewise, the outlet shape of the common distributor 110, which is shown in FIG. 17, is elongated with an orientation along the first transverse axis 21, as its length 116 along the first transverse axis 21 is larger than its width 117 along the second transverse axis 22.

The outlet shape of the common distributor 110 at its outlet 115 shown in FIG. 17 equals its inlet shape at its inlet 111 shown in FIG. 12, whereby the inlet shape and the outlet shape have different orientations within the cross-section perpendicular to the longitudinal axis 20. The outlet shape is elongated and orientated along the first transverse axis 21 and the inlet shape is elongated and orientated along the second transverse axis 22. In total, the outlet shape equals the inlet shape rotated by 90° around the longitudinal axis 20.

Minor shape differences in the cross-sections shown in FIGS. 12 and 17 result from different relative longitudinal positions of the depicted cross-sectional cuts relative to the common distributor 110. Furthermore, the shape and orientation of the outlet 115 of the common distributor 110 equals the shape and orientation of the outlet 115 of the inlet distributor 132, whereby minor differences in the cross-sections shown in FIGS. 6 and 17 likewise result from different relative longitudinal positions of the depicted cross-sectional cuts relative to the distributors 132, 110.

At its outlet 115, the distributor 110 discharges in parallel into the first, second, third and fourth mixing passage 121, 122, 123, 124 of the mixing segment 100. The mixing passages 121, 122, 123, 124 of the mixing segment 100 are configured in the same way as the mixing passages 121, 122, 123, 124 of the inlet segment 130 shown in FIGS. 5 to 12. As can be seen from FIG. 17, the inlets 125 of the mixing passages 121, 122, 123, 124 of the mixing segment 110 are arranged in the same inlet sequence along the first transverse axis 21 as the mixing passages 121, 122, 123, 124 of the inlet segment 130 shown in FIG. 6.

As can be seen from FIGS. 12 to 17, the common distributor 110 redistributes every material portion that it receives from a single passage 121, 122, 123, 124 at its inlet 111 over all passages 121, 122, 123, 124 at its outlet 115. Thereby, the relative stacking of the material portions from the individual inlet passages 121, 122, 123, 124 along the second transverse axis 22 remains constant and the individual material portions from the passages 121, 122, 123, 124 at the inlet 111 of the distributor 110 are stretched over the entire length 116 of the distributor 110 at its outlet 115.

Along the longitudinal length 118 in the flow direction 25, the mixing passages 121, 122, 123, 124 of the mixing segment 100 become rearranged in the same way as it is described and shown in connection with FIGS. 5 to 12 for the mixing passages 121, 122, 123, 124 of the inlet segment 130. This rearrangement and the resulting outlet arrangement are indicated in FIG. 18 by arrows and dashed lines, respectively.

Since the mixing passages 121, 121, 123, 124 of the mixing segment 110 are connected to the distributor 110 one after the other along the first transverse axis 21 at the outlet 115 of the distributor 115, every mixing passage 121, 122, 123, 124 receives the material portions 10, 12 in the same stacking with respect to the second transverse axis 22. At the outlets 126 of the passages 121, 122, 123, 124, the rearrangement of the mixing passages 121, 122, 123, 124 then results in the material portions 10, 12 becoming rearranged in a way that facing sections of neighboring passages 121, 122, 123, 124 along the second transverse axis 22 contain material portions from opposite sides of the distributor 110 along the second transverse axis 22. This can be best seen from the corresponding rearrangement of the mixing passages 121, 122, 123, 124 of the inlet segment 130 shown in FIGS. 5 to 12.

Figure 19:
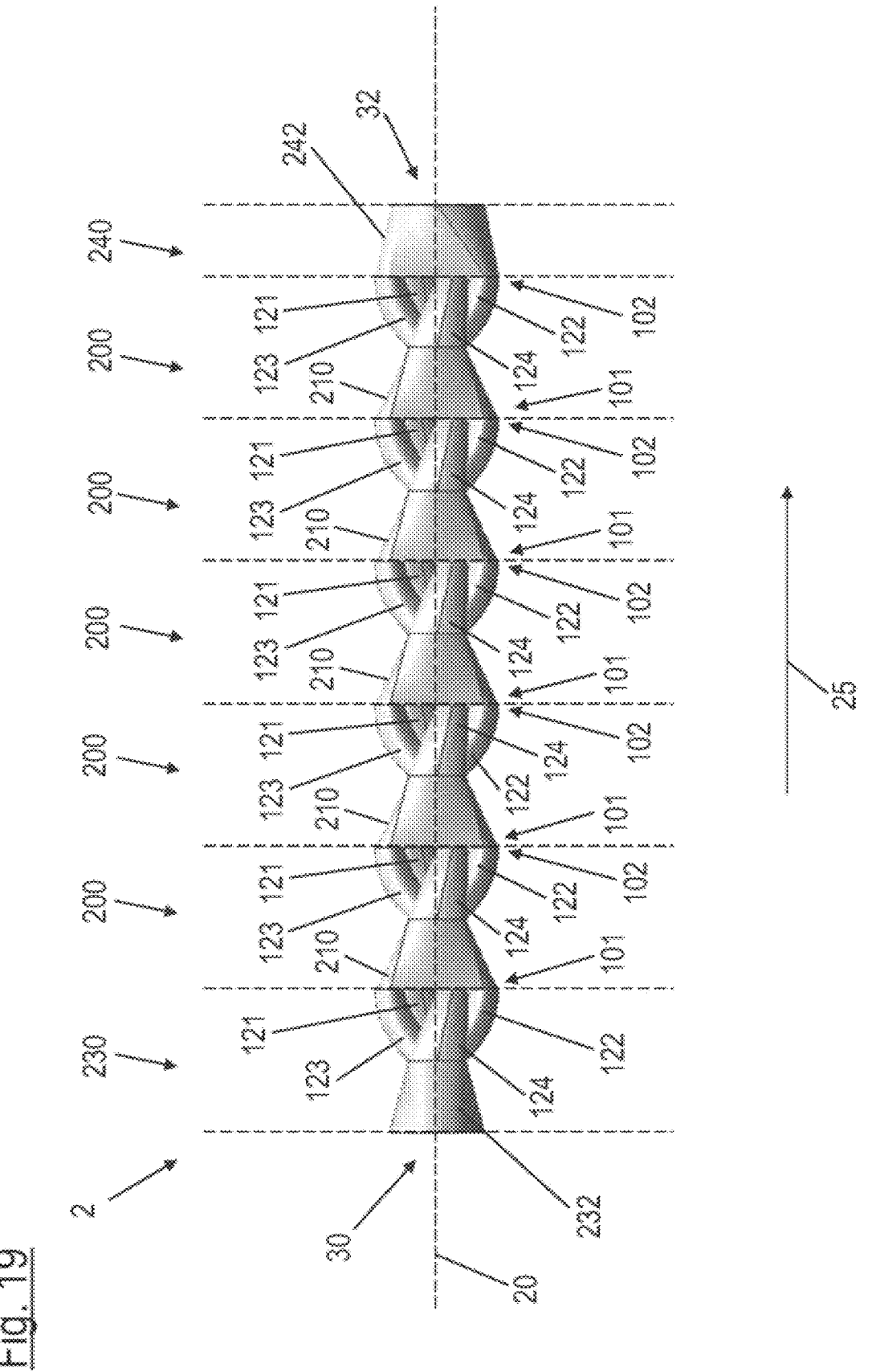
FIG. 19 illustrates a second static mixer according to the present disclosure.

FIG. 19 shows a second static mixer 2 according to the present disclosure. As far as no differences are described or apparent from the Figures, the second static mixer 2 is configured as it is shown and described in connection with the first static mixer 1.

The second static mixer 2 has an inlet segment 230, five mixing segments 200 and an outlet segment 240, which are consecutively arranged along a longitudinal axis 20 of the second static mixer 2. The inlet segment 230 comprises an inlet distributor 232 at the inlet 30 of the second static mixer 2, which is connected in parallel to four mixing passages 121, 122, 123, 124 of the inlet segment 230 in the flow direction 25. The mixing segments 200 comprise common distributors 210 at their inlets 101, each of which are connected in parallel to four mixing passages 121, 122, 123, 124. The mixing passages 121, 122, 123, 124 of the mixing segments 200 are configured in the same way as the mixing passages 121, 122, 123, 124 of the inlet segment 230. The last mixing segment 200 discharges into an outlet collector 242 of the outlet segment 240, which guides the mixed material towards a circular outlet 32 of the second static mixer 2.

Figure 20:
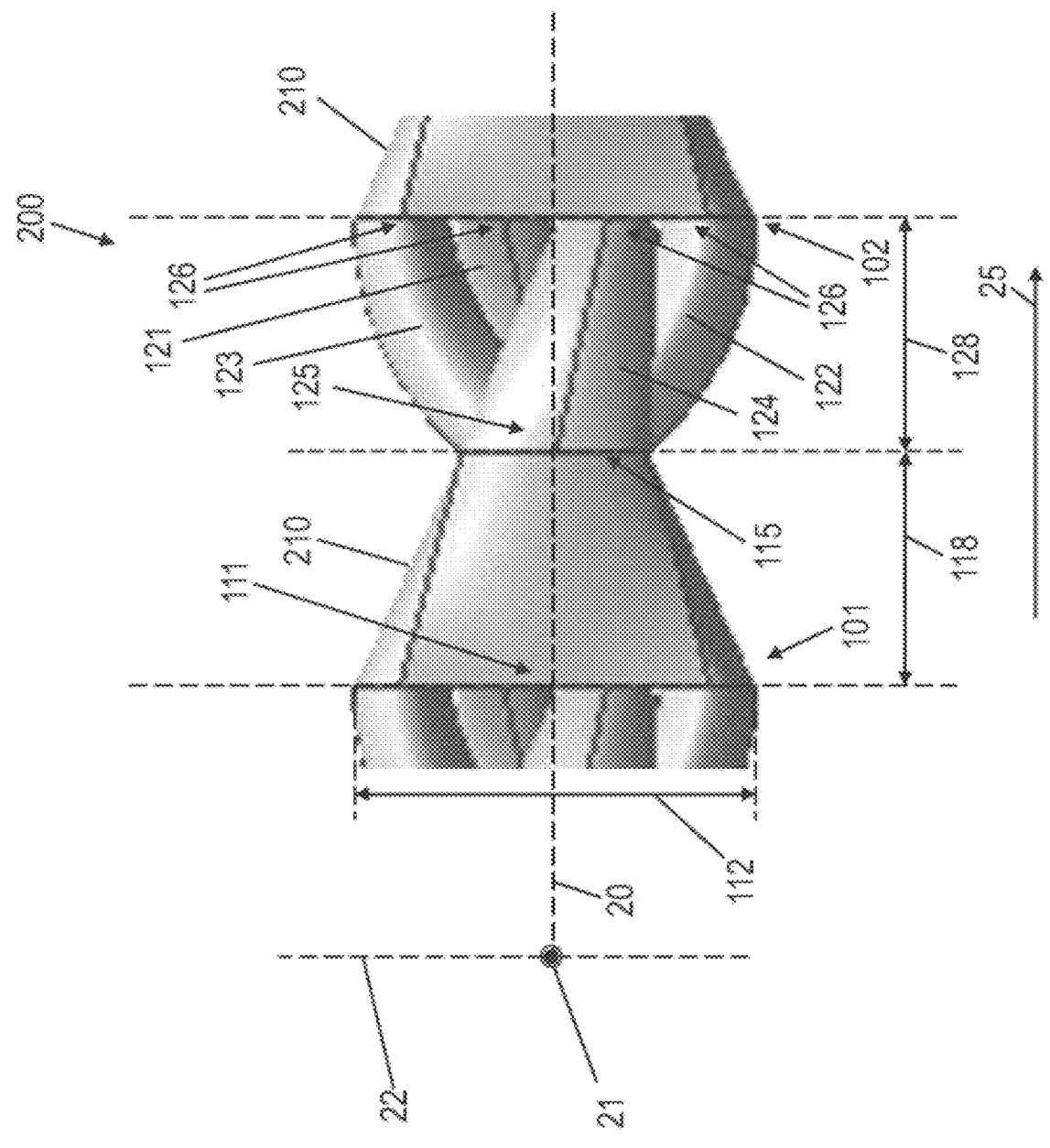
FIG. 20 illustrates a mixing segment of the second static mixer.

FIG. 20 shows one of the mixing segments 200 of the second static mixer 2. A ratio of the longitudinal length 118 of the common distributor 210 to its diameter is 0.6, whereby the diameter corresponds to the length 112 of the distributor 210 along the second transverse axis 22 at its inlet 111 and its length along the first transverse axis 21 at its outlet 115. Furthermore, a ratio between the longitudinal length 118 of the common distributor 210 to a longitudinal length 128 of the passages 121, 122, 123, 124 along the longitudinal axis 20 is equal to 1. Unlike the common distributor 110 of the first static mixer 1, the common distributor 210 of the second static mixer 2 has a flat inlet surface at its inlet 111 and a flat outlet surface at its outlet 115, both of which are orientated perpendicular to the longitudinal axis 20.

The mixing passages 121, 122, 123, 124 are configured as separated and bent tubes that are spaced apart from each other by clearances. The inlets 125 of the mixing passages 121, 122, 123, 124 are placed directly next to each other along the second transverse axis 22 at the outlet 125 of the distributor 210 and the outlets 126 of the mixing passages 121, 122, 123, 124 are also placed directly next to each other along the first transverse axis 21 at the inlet of the distributor 210 of the following mixing segment 200.

Figure 21:
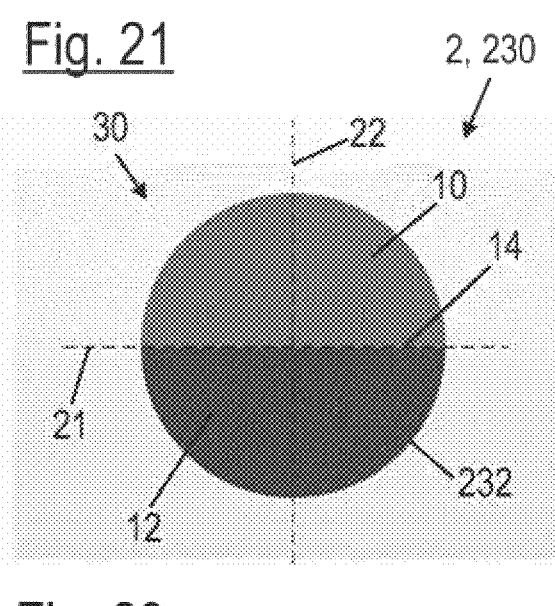
FIG. 21 illustrates a cross-section of the second static mixer at its inlet.
Figure 22:
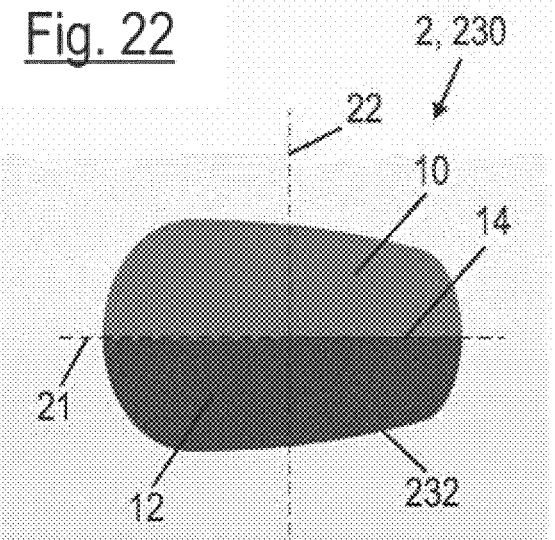
Figure 23:
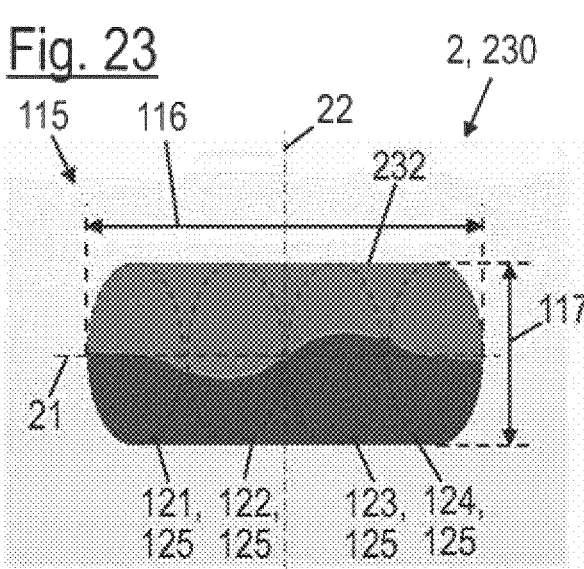
Figure 24:
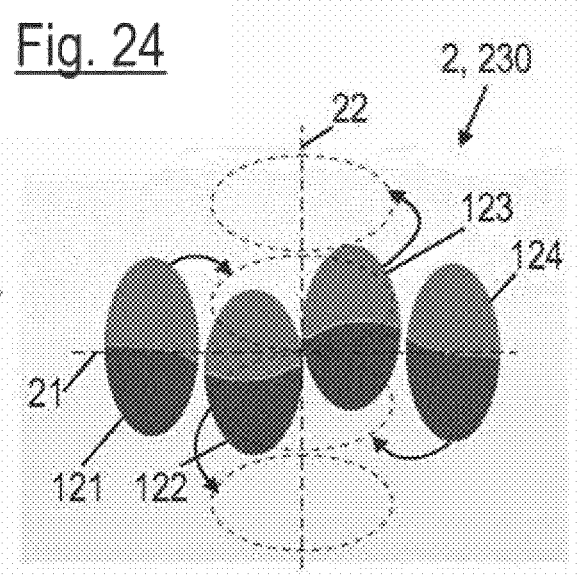
Figure 25:
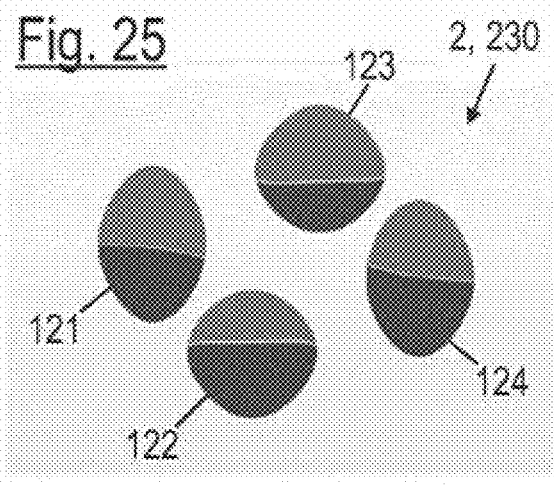
Figure 26:
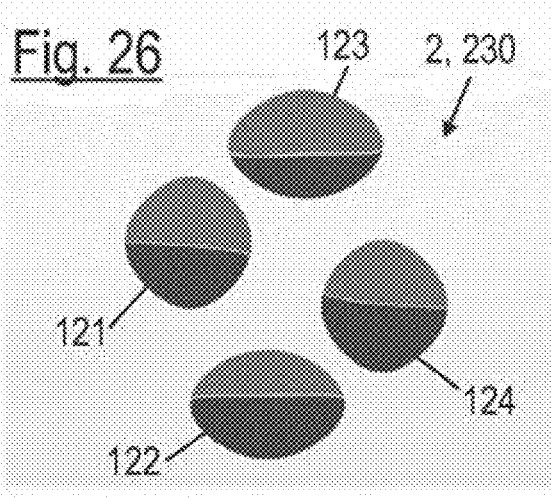
Figure 27:
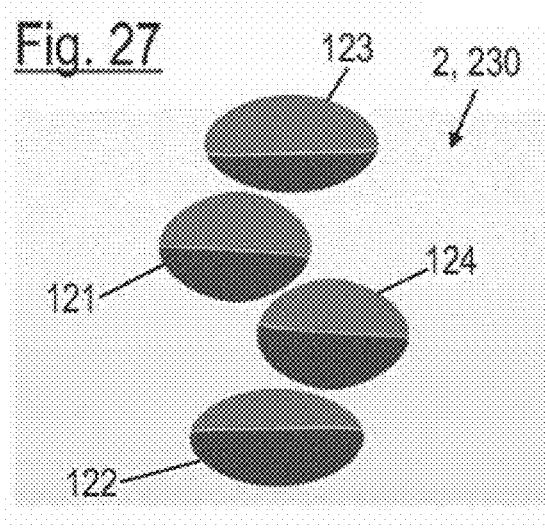
Figure 28:
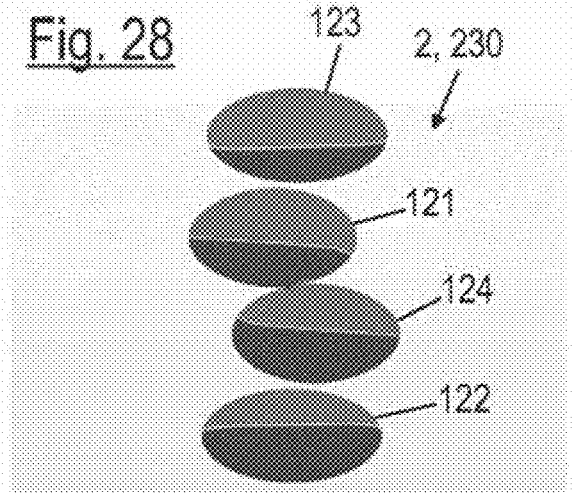

FIG. 21 shows a cross-section of the inlet distributor 232 perpendicular to the longitudinal axis 20 at the inlet 30. FIGS. 22 and 23 show cross-sections of the inlet distributor 232 perpendicular to the longitudinal axis 20 at consecutive positions along the flow direction 25. The inlet distributor 232 continuously deforms from its circular cross-section at the inlet 30 to a cross-section elongated along the first transverse axis 21 at its outlet 115, which is shown in FIG. 23. At its outlet 115, the inlet distributor 232 connects in parallel to the inlets 125 of the first mixing passage 121, the second mixing passage 122, the third mixing passage 123 and the fourth mixing passage 124. All mixing passages 121, 122, 123, 124 have oval shaped cross-sections at their inlets 125.

As it is shown in FIG. 23, the inlets 125 form an inlet arrangement wherein the inlets 125 of the first, second, third and fourth mixing passage 121, 122, 123, 124 are arranged one after the other along the first transverse axis 21 and wherein the oval shapes of the inlets 125 are orientated parallel to each other along the second transverse axis 22.

Figure 29:
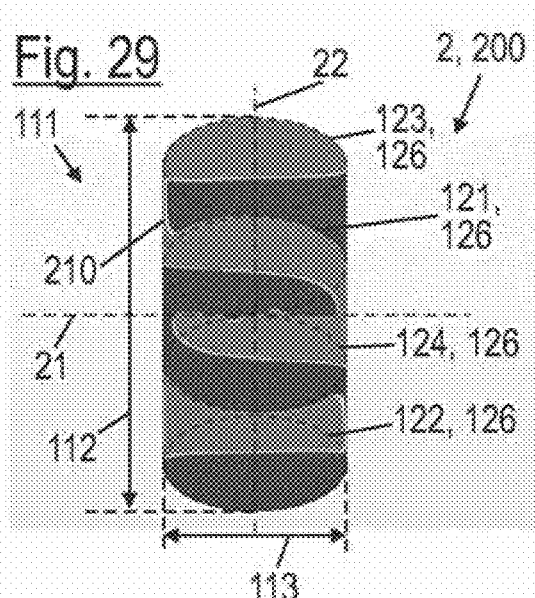
Figure 30:
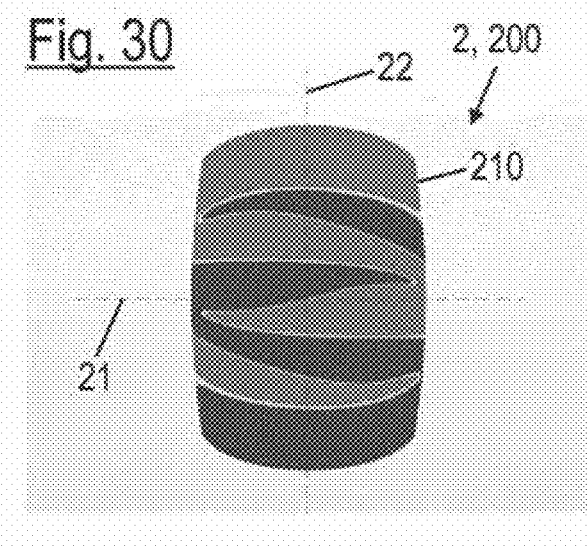
Figure 31:
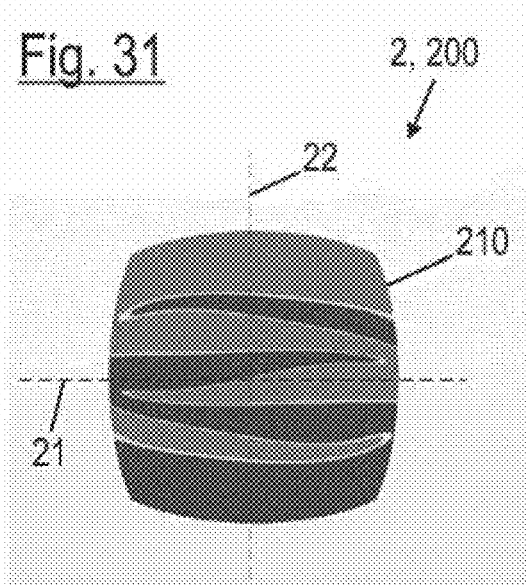
Figure 32:
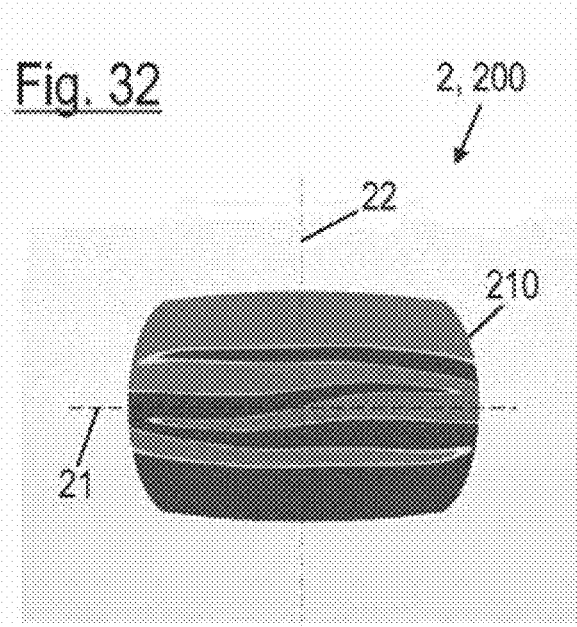

FIGS. 24 to 28 show cross-sections of the mixing passages 121, 122, 123, 124 of the inlet segment 230 at consecutive positions along the flow direction 25 and FIG. 29 shows the connection of the passages 121, 122, 123, 124 to the inlet 111 of the common distributor 210 of the first mixing segment 200. As it is indicated by dashed lines in FIG. 24, the relative positions of the mixing passages 121, 122, 123, 124 of the second static mixer 2 become rearranged between the distributors 232, 210. With respect to the longitudinal axis 20, the relative positions of the mixing passages 121, 122, 123, 124 of the second static mixer 2 become rearranged in opposite directions compared to the mixing passages 121, 122, 123, 124 of the first static mixer 1.

An outlet arrangement of the outlets of the mixing passages 121, 122, 123, 124, which is shown in FIG. 29, consecutively comprises the second mixing passage 122, the fourth mixing passage 124, the first mixing passage 121 and the third mixing passage 123 in an outlet sequence of the outlets 126. The shapes of the individual passages 121, 122, 123, 124 in the outlet arrangement shown in FIG. 29 are the same as the shapes of the passages 121, 122, 123, 124 in the inlet arrangement shown in FIG. 23. Thereby, all shapes in the outlet arrangement are rotated by 90° with respect to the shapes in the inlet arrangement.

As it is shown in the sequence of FIGS. 23 to 29, the cross-sectional shapes of the individual passages 121, 122, 123, 124 continuously deform from their oval shapes aligned along the second transverse axis 22 at their inlets 125 via the intermediate shapes shown in FIGS. 25 to 28 to their oval shapes aligned along the first transverse axis 21 at their outlets 126.

FIGS. 29 to 33 show cross-sections of the common distributor 210 perpendicular to the longitudinal axis 20 at consecutive positions along the flow direction 25. The cross-section of the common distributor 210 continuously deforms from its inlet shape shown in FIG. 29 via intermediate shapes shown in FIGS. 30 to 32 into its outlet shape shown in FIG. 33. At its outlet 115, the distributor 210 is connected to the inlets 125 of the mixing passages 121, 122, 123, 124 of the mixing segment 200.

The outlet shape of the distributor 210 shown in FIG. 33 equals the inlet shape of the distributor 210 shown in FIG. 29, whereby the outlet shape is rotated by 90° with respect to the inlet shape. The length 116 of the outlet shape along the first transverse axis 21 equals the length 112 of the inlet shape along the second transverse axis 22 and the width of the outlet shape 117 along the second transverse axis 22 equals the width 113 of the inlet shape along the first transverse axis 21.

FIG. 34 shows a cross-section through the mixing passages 121, 122, 123, 124 of the mixing segment 200 at a downstream position behind the distributor 210 in the flow direction 25 with their outlet arrangement indicated by dashed lines. The rearrangement of the passages 121, 122, 123, 124 of the mixing segment 200 corresponds to the rearrangement of the passages 121, 122, 123, 124 of the inlet segment 230 shown in FIGS. 23 to 29.

Figure 35:
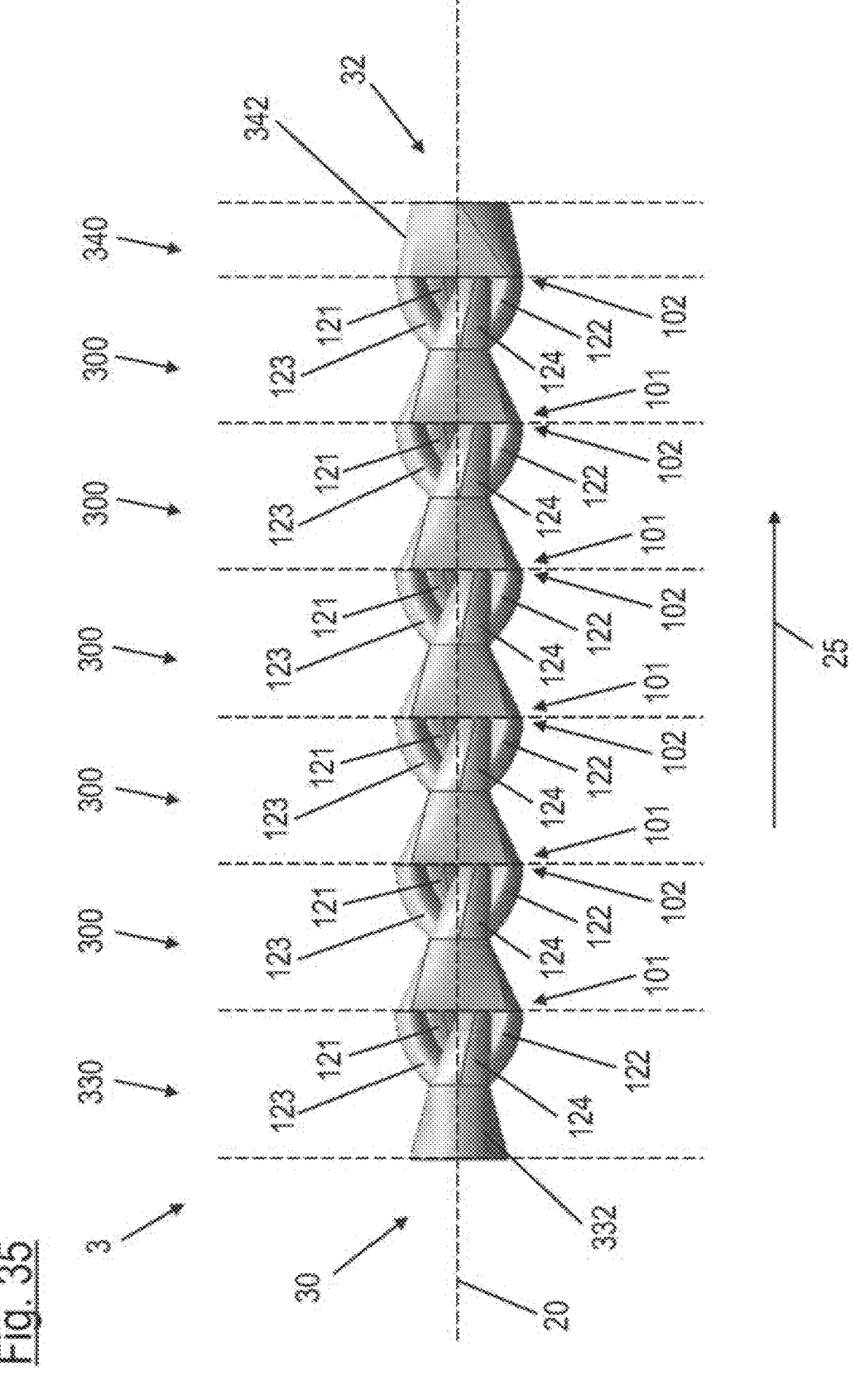
FIG. 35 illustrates a third static mixer according to the present disclosure.

FIG. 35 shows a third static mixer 3 according to the present disclosure. As far as no differences are described or apparent from the Figures, the third static mixer 3 is configured as it is shown and described in connection with the second static mixer 2.

The third static mixer 3 has an inlet segment 330, five mixing segments 300 and an outlet segment 340, which are consecutively arranged along a longitudinal axis 20 of the third static mixer 3. The inlet segment 330 comprises an inlet distributor 332 and the mixing segments 300 comprise common distributors 310 at their inlets 101, each of which are followed by four mixing passages 121, 122, 123, 124, respectively. The last mixing segment 300 discharges into an outlet collector 342 of the outlet segment 340.

Figure 36:
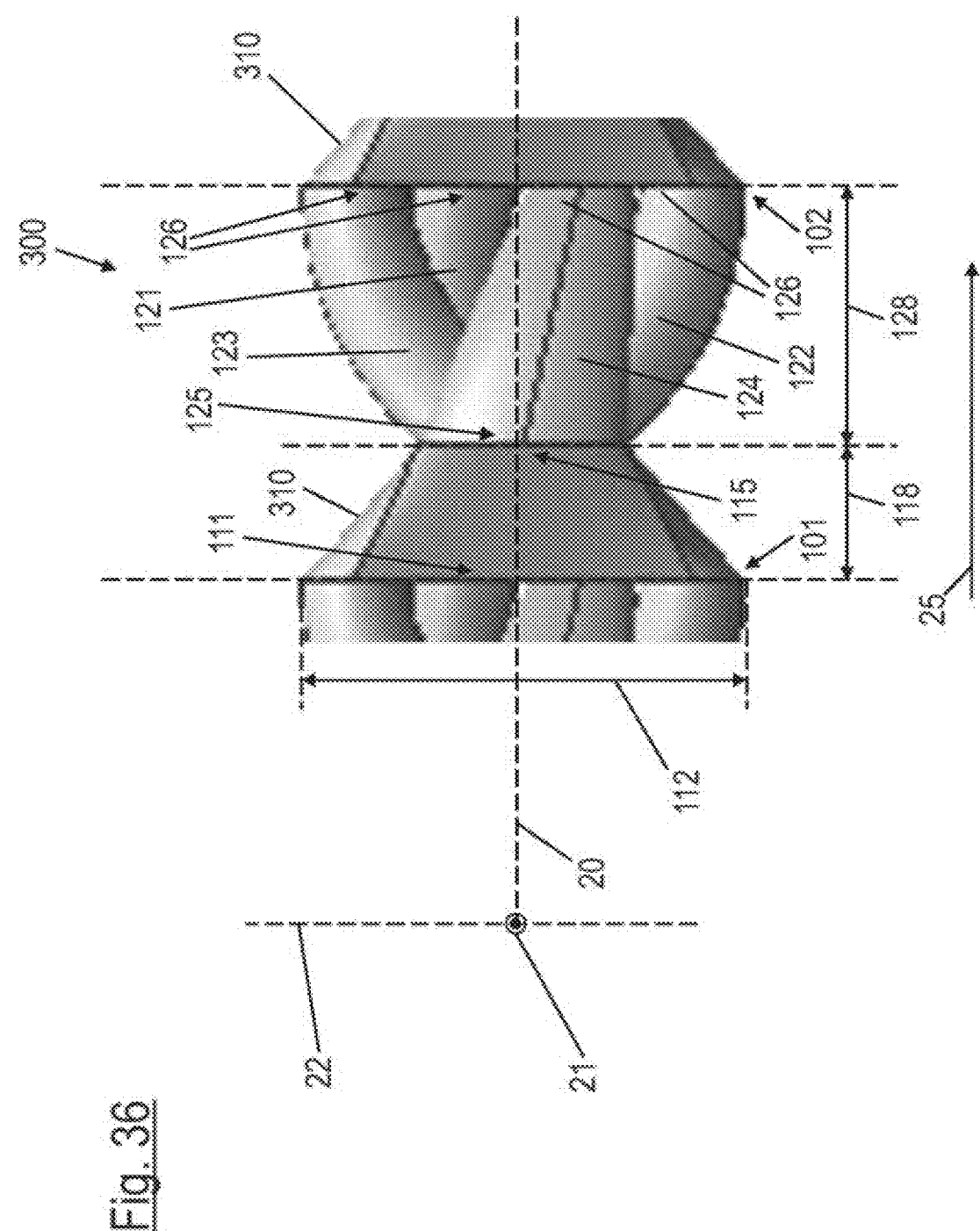
FIG. 36 illustrates a mixing segment of the third static mixer.
Figure 43:
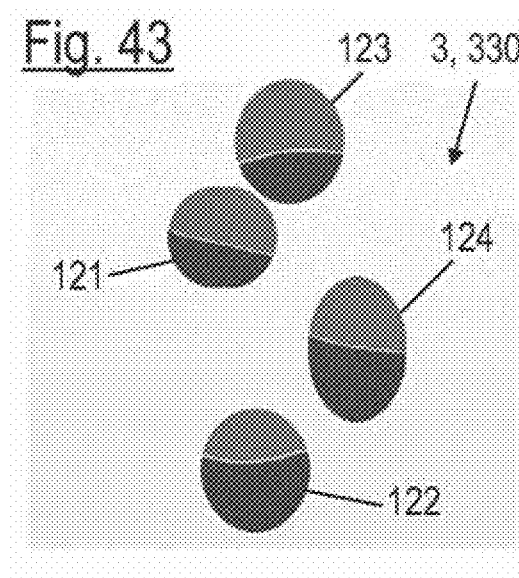
Figure 44:
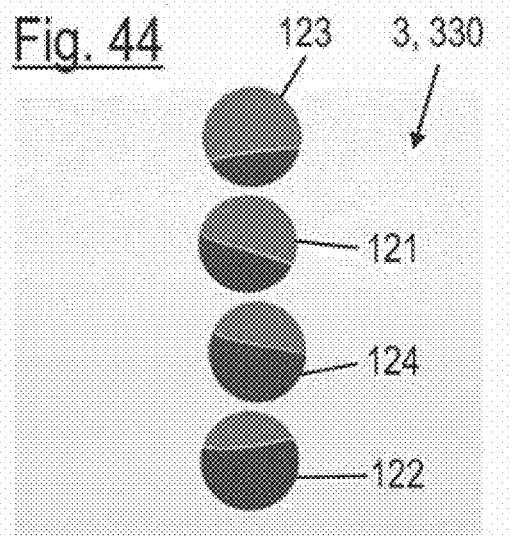

FIG. 36 shows one of the mixing segments 300 of the third static mixer 3. A ratio of the longitudinal length 118 of the common distributor 310 to its diameter, which corresponds to its length 112 along the second transverse axis 22 at its inlet 111 and to its length along the first transverse axis 21 at its outlet 115, is 0.3. Furthermore, a ratio between the longitudinal length 118 of the common distributor 310 to a longitudinal length 128 of the passages 121, 122, 123, 124 along the longitudinal axis 20 is equal to 0.5.

FIG. 37 shows a cross-section of the inlet distributor 332 perpendicular to the longitudinal axis 20 at the inlet 30. FIGS. 38 and 39 show cross-sections of the inlet distributor 332 perpendicular to the longitudinal axis 20 at consecutive positions along the flow direction 25. The outlet cross-section of the distributor 332 at its outlet 115 and the inlet arrangement of the inlets 125 of the mixing passages 121, 122, 123, 124, which are shown in FIG. 39, are configured identical to those of the second static mixer 2.

Figure 45:
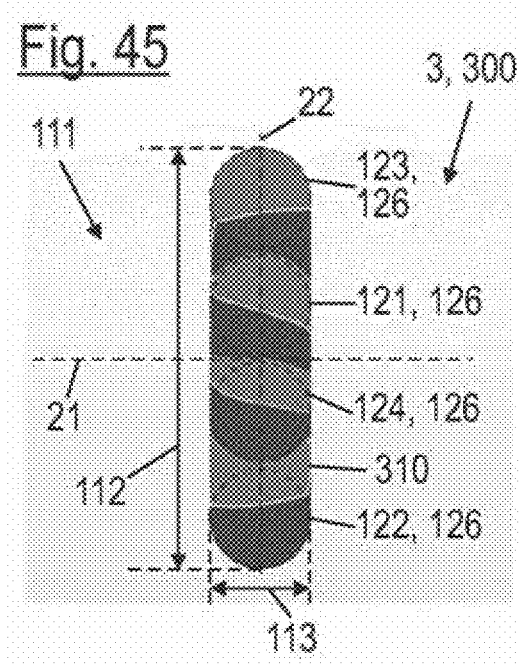
Figure 46:
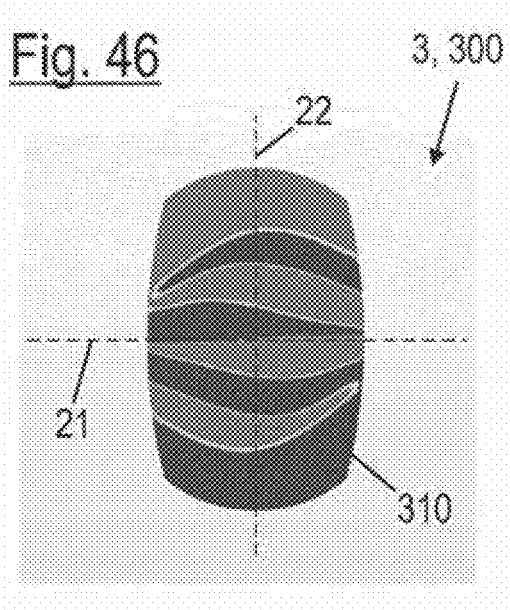
Figure 47:
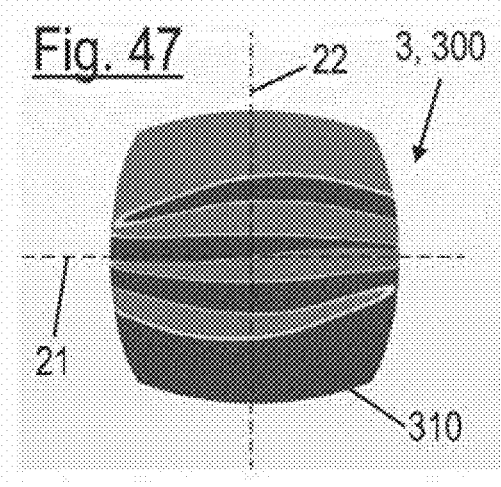
Figure 48:
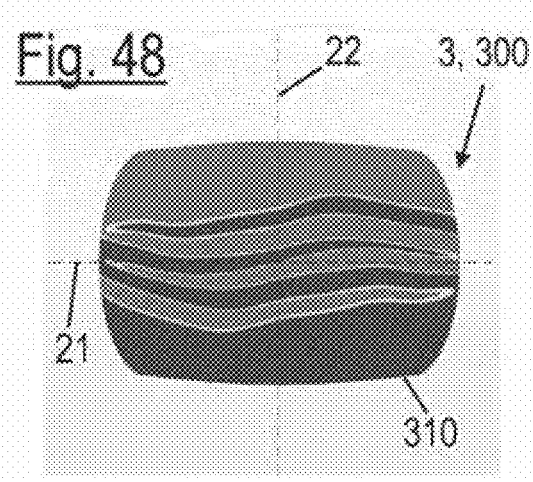

FIGS. 40 to 44 show cross-sections of the mixing passages 121, 122, 123, 124 of the inlet segment 330 at consecutive positions along the flow direction 25 and FIG. 45 shows the inlet 111 of the common distributor 310 of the first mixing segment 300 and the outlet arrangement of the mixing passages 121, 122, 123, 124.

The mixing passages 121, 122, 123, 124 become rearranged from their inlet arrangement shown in FIG. 39 to the outlet arrangement that is indicated in FIGS. 40 and 45 by dashed lines. The positions of the mixing passages 121, 122, 123, 124 of the third static mixer 3 become rearranged between the distributors 332, 310 in the same way as the relative positions of the mixing passages 121, 122, 123, 124 of the second static mixer 2.

The shapes of the individual cross-sections of the outlets 126 of the passages 121, 122, 123, 124 within the outlet arrangement are circular. The individual mixing passages 121, 122, 123, 124 continuously deform via intermediate shapes, which are depicted in FIGS. 41 to 44 from the elliptical shapes at their inlets 125 to the circular shapes at their outlets 126. The areas of the inlet shapes of the individual passages 121, 122, 123, 124 shown in FIG. 39 are larger than the areas of the corresponding outlet shapes shown in FIG. 45.

FIGS. 45 to 49 show cross-sections of the common distributor 310 perpendicular to the longitudinal axis 20 at consecutive positions along the flow direction 25. The cross-section of the common distributor 310 continuously deforms from its inlet shape shown in FIG. 45 via intermediate shapes shown in FIGS. 46 to 48 into its outlet shape shown in FIG. 49. The length 112 of the inlet 111 of the common distributor 310 along the second transverse axis 22 equals the length 116 of its outlet 115 along the first transverse axis 21. The width 113 of the inlet 111 along the first transverse axis 21 is smaller than the width 117 of the outlet 115 along the second transverse axis 22. In general, the shape of the inlet 111 of the distributor 310 is elongated along the second transverse axis 22 and the shape of the outlet 115 of the distributor 310 is elongated along the first transverse axis 21.

Figures 49, 50:
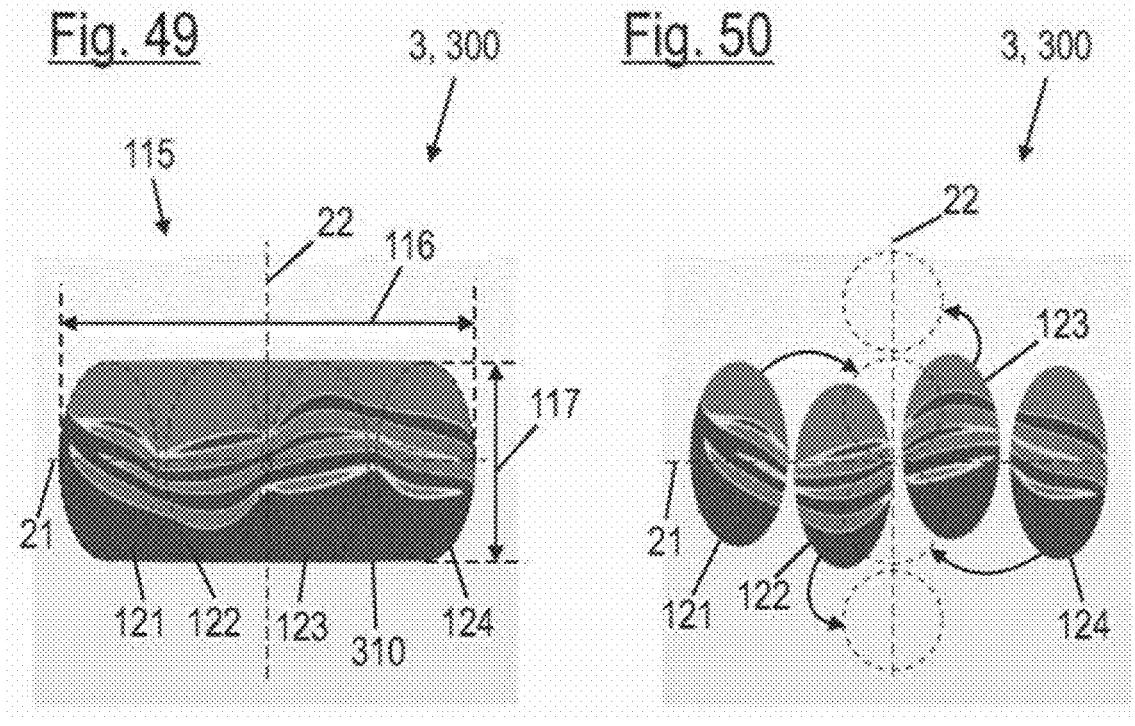

FIG. 50 shows a cross-section through the mixing passages 121, 122, 123, 124 of the mixing segment 300 at a downstream position behind the distributor 310 in the flow direction 25 with their outlet arrangement indicated by dashed lines. The rearrangement and deformation of the passages 121, 122, 123, 124 of the mixing segment 300 corresponds to the rearrangement and deformation of the passages 121, 122, 123, 124 of the inlet segment 330 shown in FIGS. 39 to 45.

Figure 51:
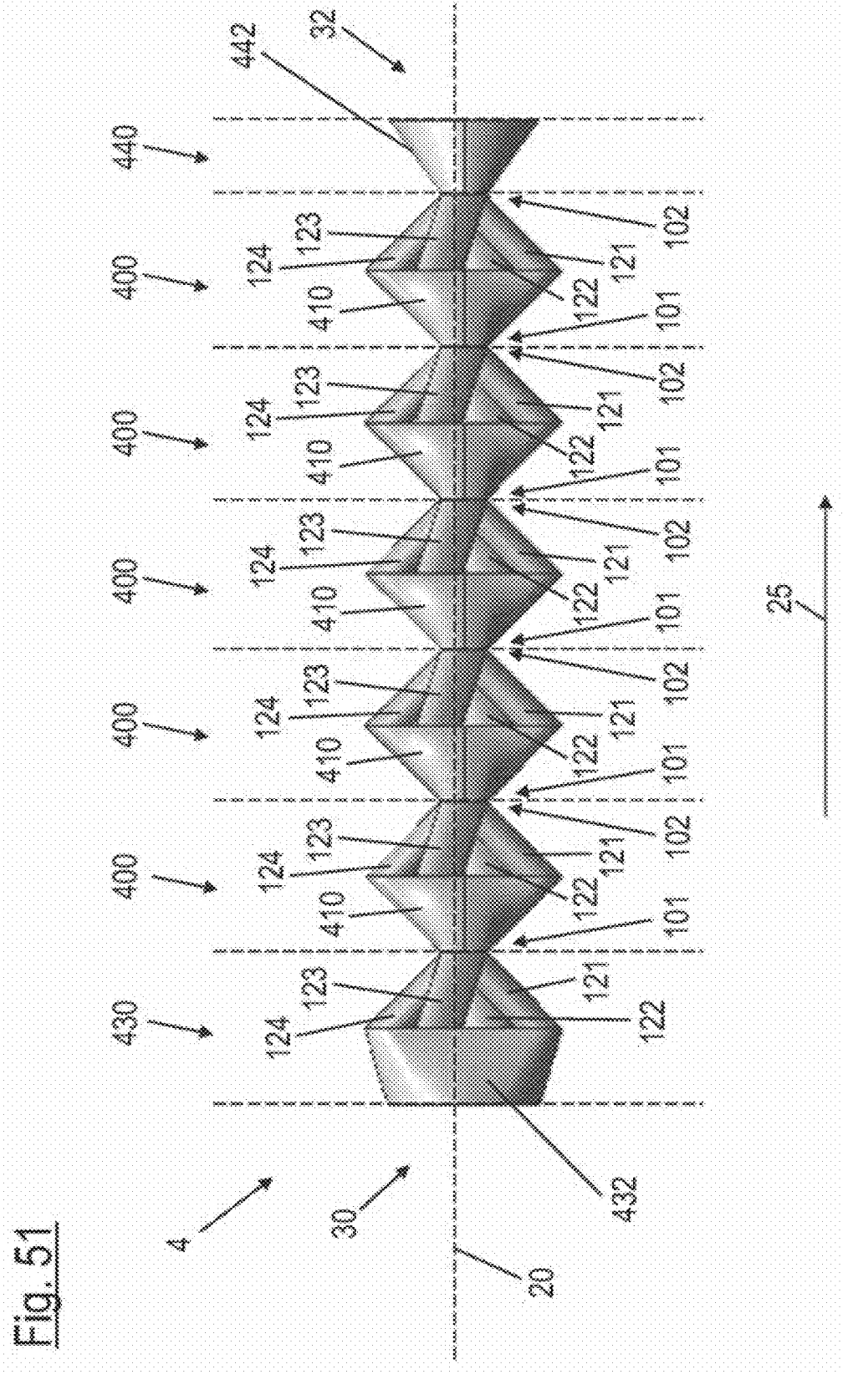
FIG. 51 illustrates a fourth static mixer according to the present disclosure.

FIG. 51 shows a fourth static mixer 4 according to the present disclosure. As far as no differences are described or apparent from the Figures, the fourth static mixer 4 is configured as it is shown and described in connection with the first static mixer 1. FIG. 51 shows the fourth static mixer 4 from a transverse position that is rotated by 90° around the longitudinal axis 20 with respect to the transverse position of FIG. 1.

The fourth static mixer 4 has an inlet segment 430, five mixing segments 400 and an outlet segment 440. The inlet segment 430 comprises an inlet distributor 432 and the mixing segments 400 comprise common distributors 410 at their inlets 101. Each of the distributors 432, 410 is followed by four mixing passages 121, 122, 123, 124, respectively. The last mixing segment 400 discharges into an outlet collector 442 of the outlet segment 440.

Figure 52:
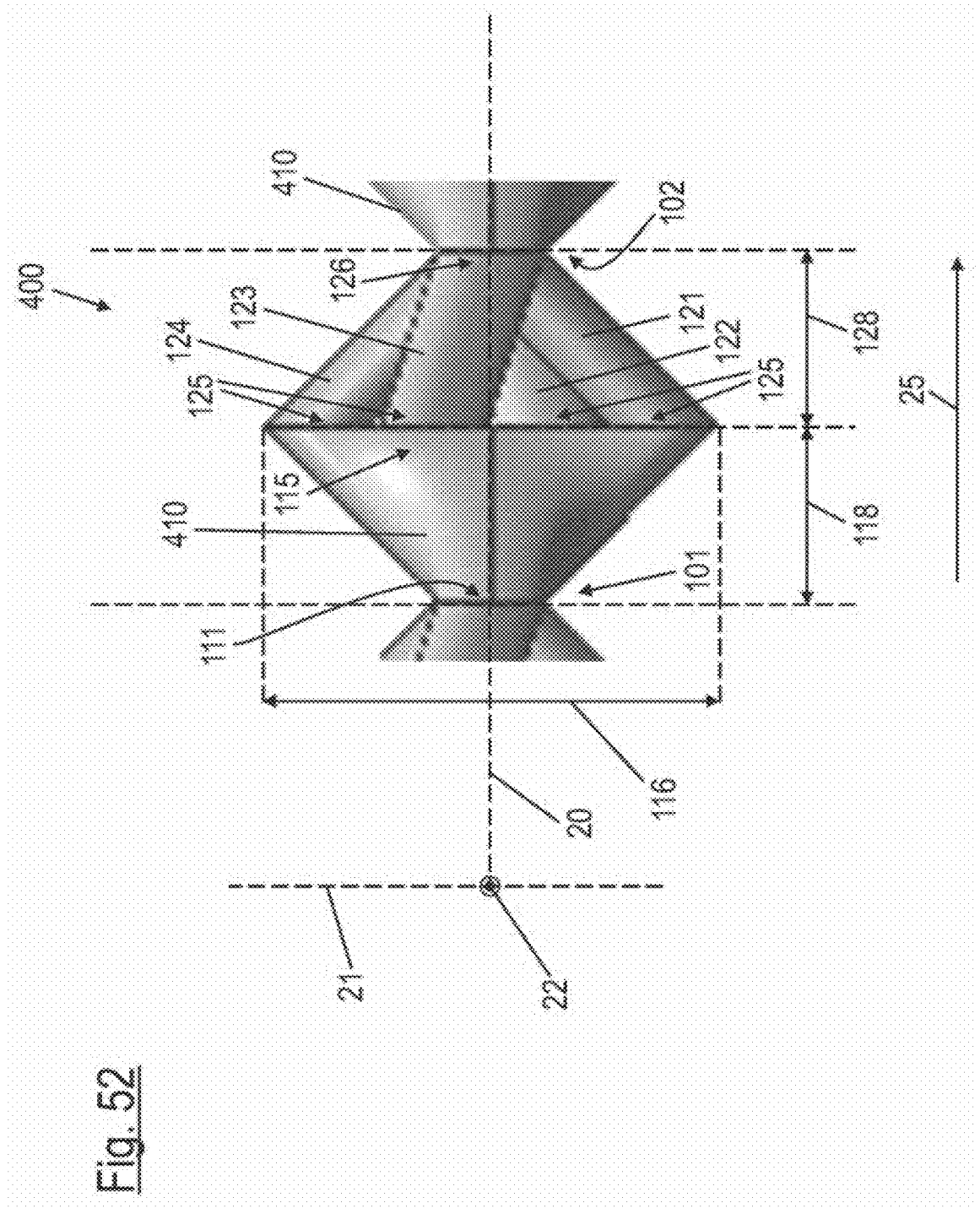
FIG. 52 illustrates a mixing segment of the fourth static mixer.
Figure 59:
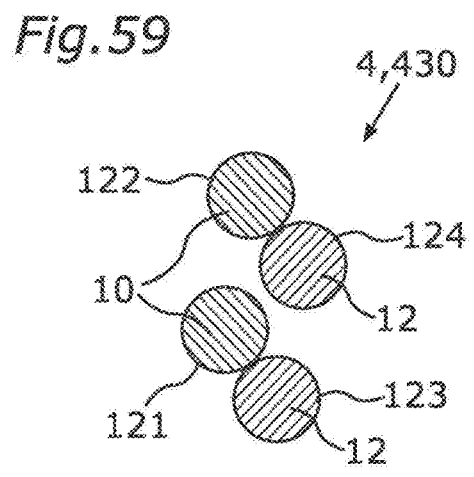
Figure 60:
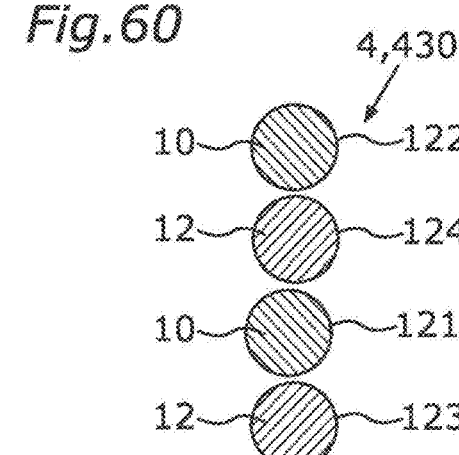

FIG. 52 shows one of the mixing segments 400 of the fourth static mixer 4 from a transverse position that is rotated by 90° around the longitudinal axis 20 with respect to FIG. 2. A ratio of the longitudinal length 118 of the common distributor 410 to its diameter, which corresponds to its length 116 along the first transverse axis 21 at its outlet 115 and to its length along the second transverse axis 22 at its inlet 111, is 0.4. Furthermore, a ratio between the longitudinal length 118 of the common distributor 410 to a longitudinal length 128 of the passages 121, 122, 123, 124 along the longitudinal axis 20 is equal to 1.

Like the common distributors 210, 310 of the second and third static mixers 2, 3, the common distributor 410 of the fourth static mixer 4 has flat inlet and outlet surfaces that are orientated perpendicular to the longitudinal axis 20. At the inlet and outlet surfaces of the distributor 410, the mixing passages 121, 122, 123, 124 are placed directly next to each other along the second transverse axis 22 and the first transverse axis 21, respectively.

FIG. 53 shows a cross-section of the inlet distributor 432 perpendicular to the longitudinal axis 20 at the inlet 30. FIGS. 54 and 55 show cross-sections of the inlet distributor 432 perpendicular to the longitudinal axis 20 at consecutive positions along the flow direction 25. Thereby, FIG. 55 depict the outlet cross-section of the distributor 432 at its outlet 115 and the inlet arrangement of the inlets 125 of the mixing passages 121, 122, 123, 124.

The outlet 115 has an elongated shape which is orientated parallel to the first transverse axis 21. A length 116 of the outlet 115 along the first transverse axis 21 is larger than a width 117 of the outlet 115 along the second transverse axis 22. The inlets 125 of the passages 121, 122, 123, 124 have circular shape and are arranged in an inlet sequence along the first transverse axis 21.

The inlet segment 430 receive the material components 10, 12 at opposing halves of its inlet 30, whereby a separating line 14 between the material components 10, 12 runs parallel to the second transverse axis 22. This results in the separating line 14 between the material components 10, 12 also running parallel to the second transverse axis 22 at the outlet 115 of the inlet distributor 430. Thereby, the separating line 14 essentially lies between the inner passages 122, 123, namely between the second and third passage 122, 123. Therefore, individual passages 121, 122, 123, 124 essentially receive a single material component 10, 12. This means that an admixture of a further material component 10,

12 is less than 10%, for example less than 5% or less than 1%. The first and second passage 121, 122 receive the same material component, namely the first material component 10, and the third and fourth passage 123, 124 also receive the same material component, namely the second material component 12. The material components 10 received by the first and second passage 121, 122 is different from the material component 12 received by the third and fourth passage 123, 124.

Figure 61:
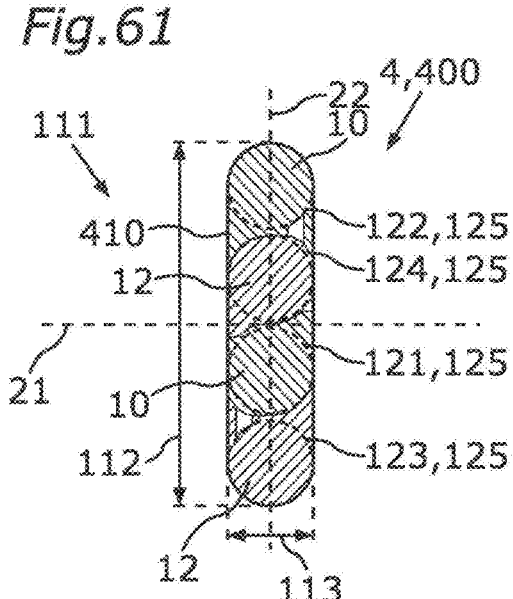
Figure 62:
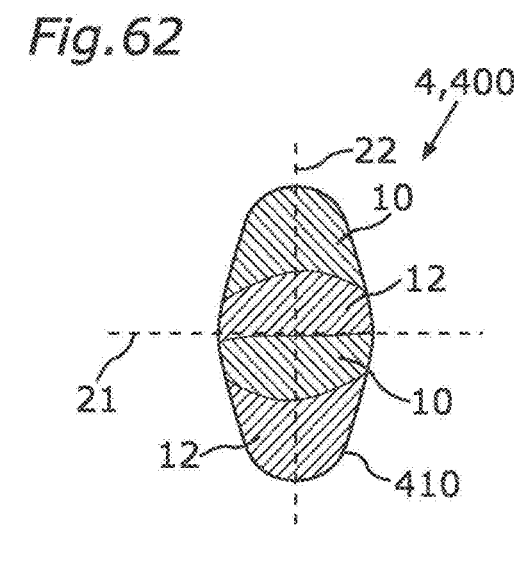
Figure 63:
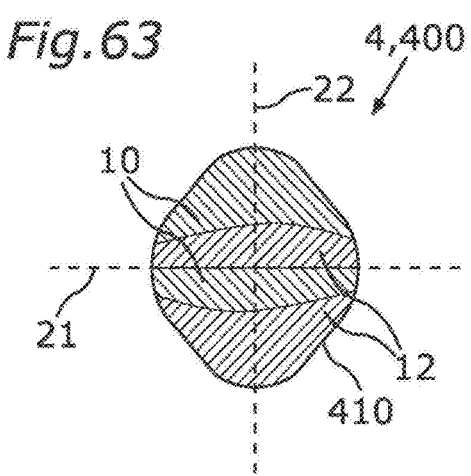
Figure 64:
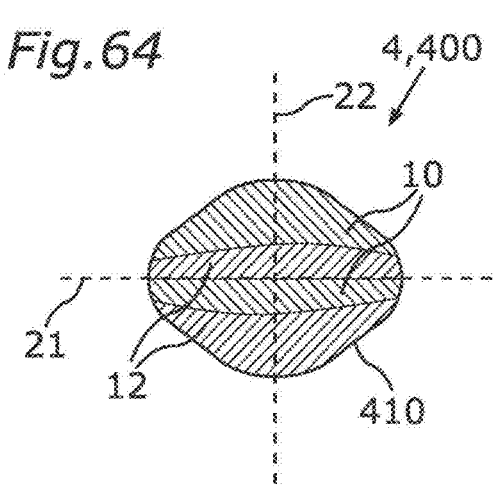

FIGS. 56 to 60 show cross-sections of the mixing passages 121, 122, 123, 124 of the inlet segment 430 at consecutive positions along the flow direction 25 and FIG. 61 shows the inlet 111 of the common distributor 410 of the first mixing segment 400 and the outlet arrangement of the mixing passages 121, 122, 123, 124.

The mixing passages 121, 122, 123, 124 become rearranged from their inlet arrangement shown in FIG. 55 to an outlet arrangement that is indicated in FIGS. 56 and 61 by dashed lines. The positions of the mixing passages 121, 122, 123, 124 of the fourth static mixer 4 become rearranged between the distributors 432, 410 in the same way as the relative positions of the mixing passages 121, 122, 123, 124 of the first static mixer 1.

Like with the first and second static mixer 1, 2, the shapes of the individual cross-sections of the passages 121, 122, 123, 124 of the fourth static mixer 4 keep their shape, area and orientation during rearrangement. With regard to the fourth static mixer 4, this means that they remain circular during rearrangement.

FIGS. 61 to 65 show cross-sections of the common distributor 410 perpendicular to the longitudinal axis 20 at consecutive positions along the flow direction 25. The cross-section of the common distributor 410 continuously deforms from its inlet shape shown in FIG. 61 via intermediate shapes shown in FIGS. 62 to 64 into its outlet shape shown in FIG. 65. The length 112 of the inlet 111 of the common distributor 410 along the second transverse axis 22 equals the length 116 of its outlet 115 along the first transverse axis 21 and the width 113 of the inlet 111 along the first transverse axis 21 equals the width 117 of the outlet 115 along the second transverse axis 22. In general, the shape of the inlet 111 of the distributor 410 is elongated along the second transverse axis 22 and the shape of the outlet 115 of the distributor 410 is elongated along the first transverse axis 21.

Since every mixing passage 121, 122, 123, 124 essentially receives a single material component 10, 12, the individual material components 10, 12 are distributed over four adjacent portions of the cross-sectional area of the inlet 111 of the distributor 410. These four adjacent portions alternately contain the first and second material component 10, 12. This is different from the transverse stacking of the material components 10, 12 within the common distributors 110, 210, 310 of the first, second and third static mixer 1, 2, 3, where the material components 10, 12 are alternately distributed over eight portions of the cross-sectional area of the inlet 111 of the distributors 110, 210, 310.

Figures 65, 66:
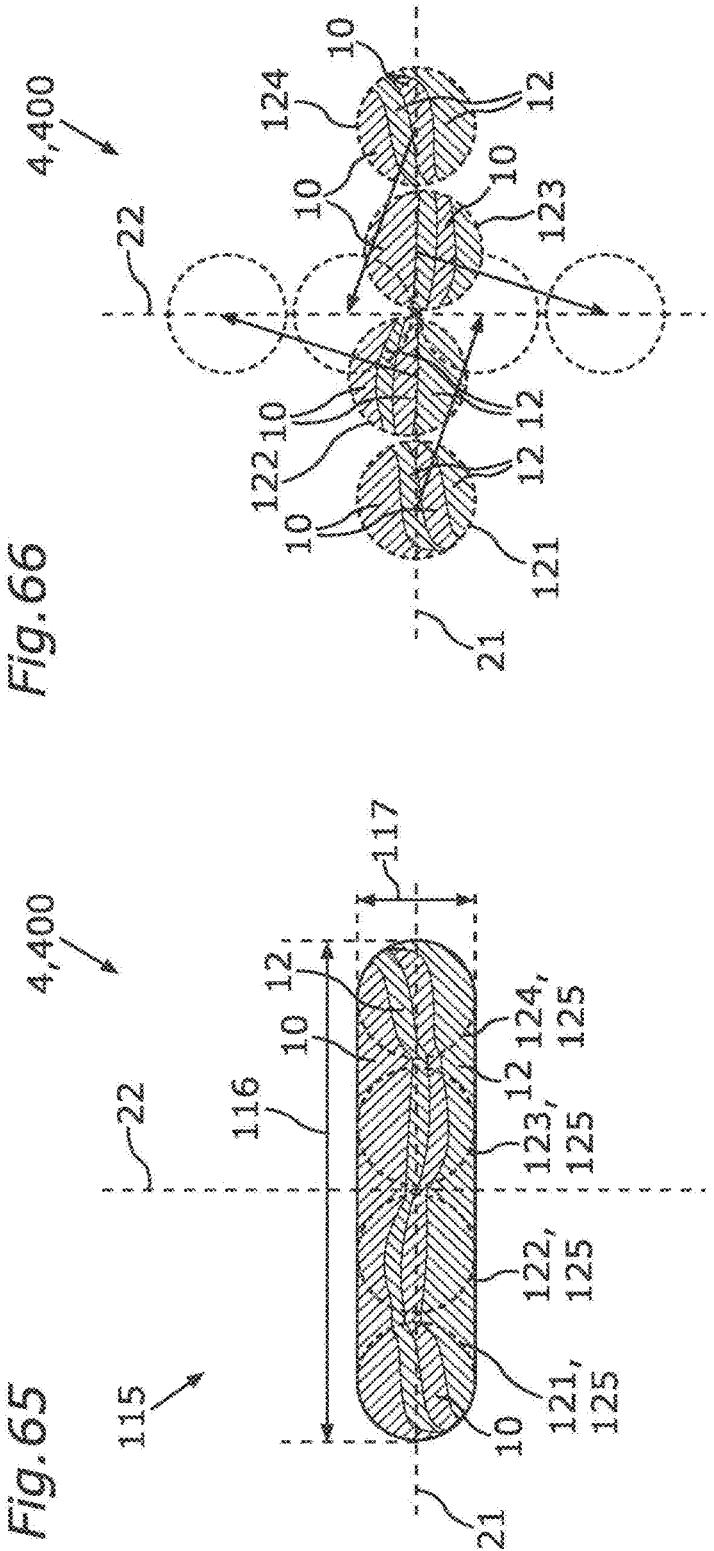

FIG. 66 shows a cross-section through the mixing passages 121, 122, 123, 124 of the mixing segment 400 at a downstream position behind the distributor 410 in the flow direction 25 with their outlet arrangement indicated by dashed lines. The rearrangement and deformation of the passages 121, 122, 123, 124 of the mixing segment 400 corresponds to the rearrangement and deformation of the passages 121, 122, 123, 124 of the inlet segment 430 shown in FIGS. 55 to 61.

Figure 67:
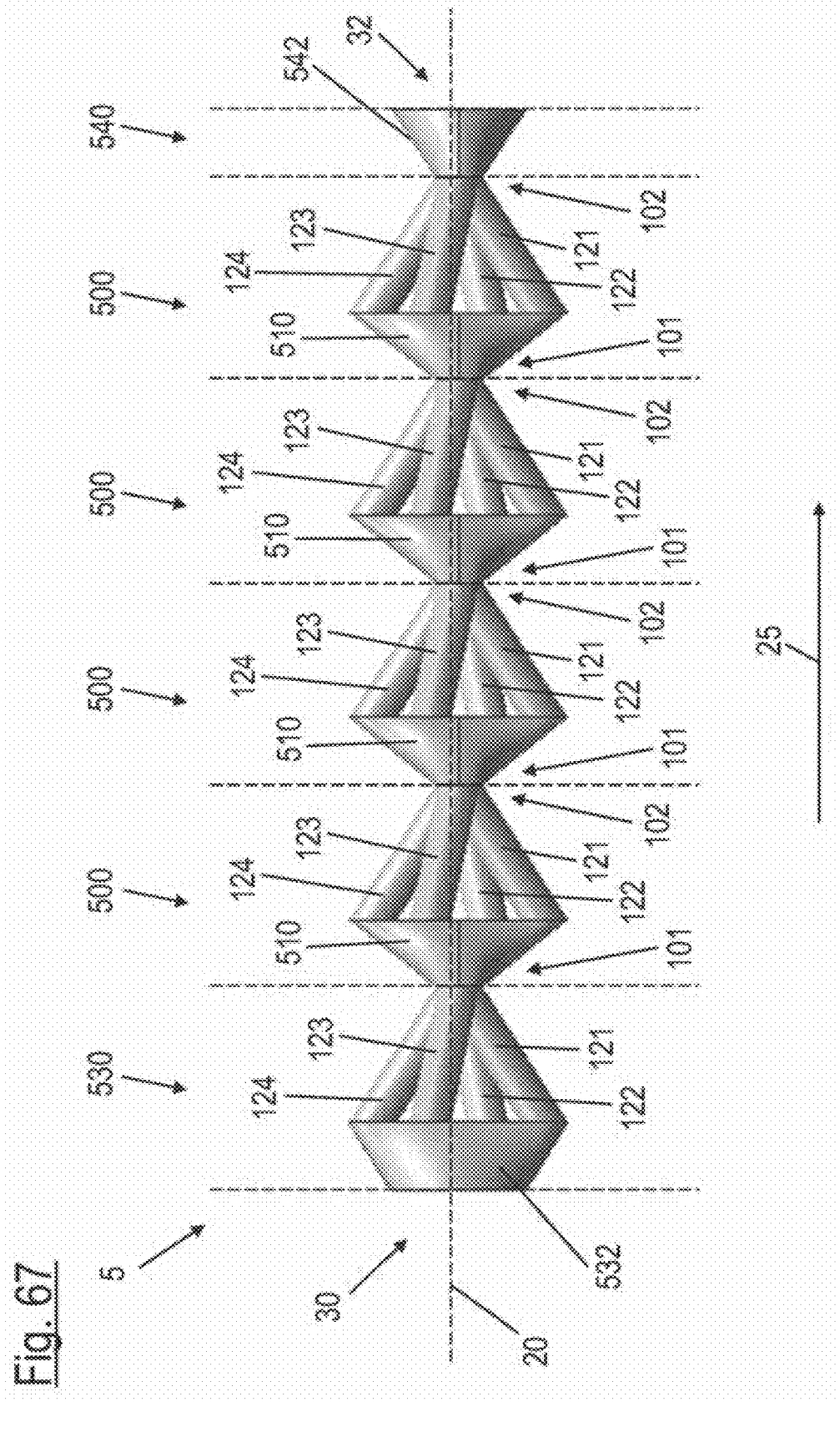
FIG. 67 illustrates a fifth static mixer according to the present disclosure.

FIG. 67 shows a fifth static mixer 5 according to the present disclosure. As far as no differences are described or apparent from the Figures, the fifth static mixer 5 is configured as it is shown and described in connection with the fourth static mixer 4.

The fifth static mixer 5 has an inlet segment 530, four mixing segments 500 and an outlet segment 540. The inlet segment 530 comprises an inlet distributor 532 and the mixing segments 500 comprise common distributors 510 at their inlets 101. Each of the distributors 532, 510 is followed by four mixing passages 121, 122, 123, 124, respectively. The last mixing segment 500 discharges into an outlet collector 542 of the outlet segment 540.

Figure 68:
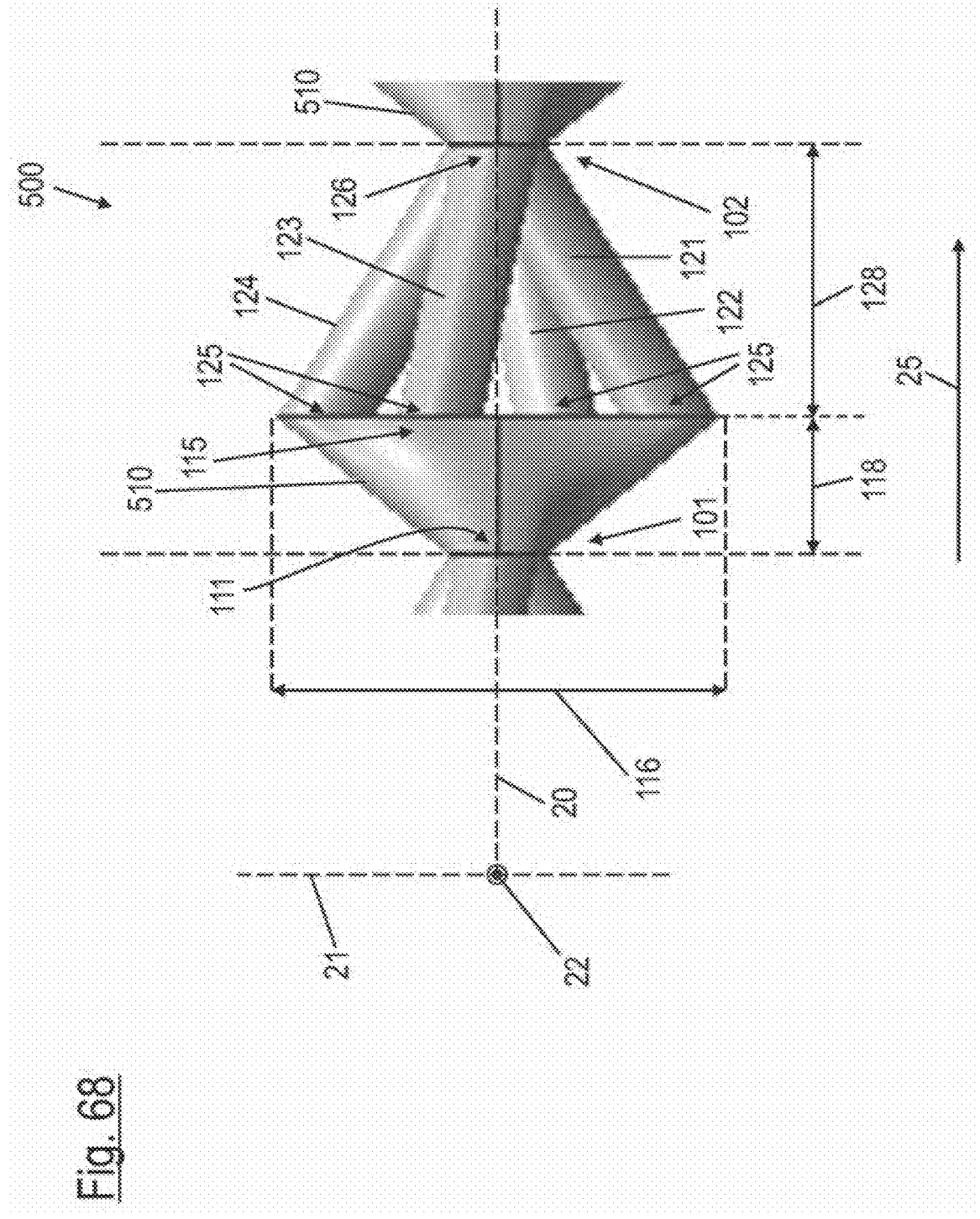
FIG. 68 illustrates a mixing segment of the fifth static mixer.
Figure 75:
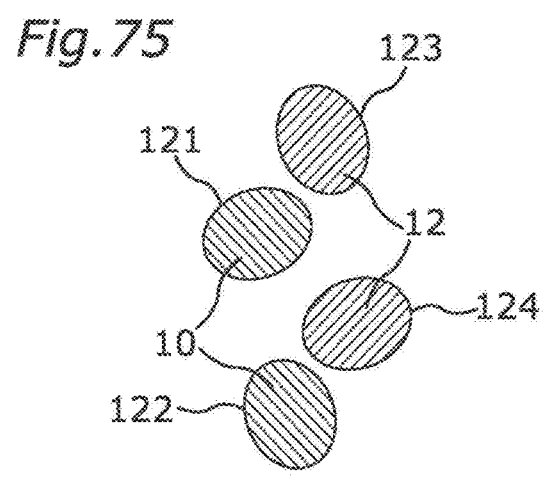
Figure 76:
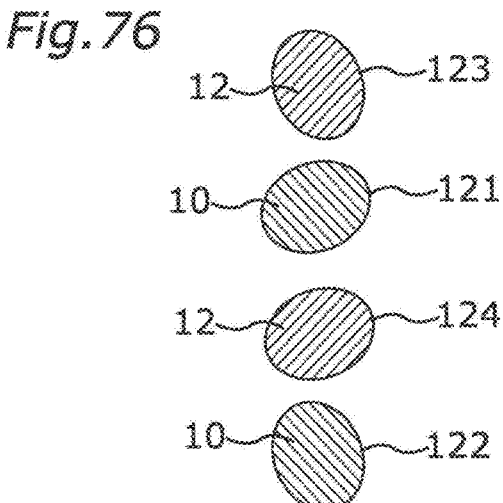

FIG. 68 shows one of the mixing segments 500 of the fifth static mixer 5. A ratio of the longitudinal length 118 of the common distributor 510 to its diameter, which corresponds to its length 116 along the first transverse axis 21 at its outlet 115 and to its length along the second transverse axis 22 at its inlet 111, is 0.3. Furthermore, a ratio between the longitudinal length 118 of the common distributor 510 to a longitudinal length 128 of the passages 121, 122, 123, 124 along the longitudinal axis 20 is equal to 0.5.

Like the common distributors 210, 310, 410 of the second, third and fourth static mixers 2, 3, 4, the common distributor 510 of the fifth static mixer 5 has flat inlet and outlet surfaces that are orientated perpendicular to the longitudinal axis 20. At the inlet and outlet surfaces of the distributors 510, the mixing passages 121, 122, 123, 124 are spaced apart from each other along the second transverse axis 22 and the first transverse axis 21, respectively.

FIG. 69 shows a cross-section of the inlet distributor 532 perpendicular to the longitudinal axis 20 at the inlet 30. FIGS. 70 and 71 show cross-sections of the inlet distributor 532 perpendicular to the longitudinal axis 20 at consecutive positions along the flow direction 25. Thereby, FIG. 71 depict the outlet cross-section of the distributor 532 at its outlet 115 and the inlet arrangement of the inlets 125 of the mixing passages 121, 122, 123, 124.

Within the inlet arrangement, the inlets 125 of the passages 121, 122, 123, 124 have elliptical shapes and are arranged in an inlet sequence along the first transverse axis 21. The relative orientation of the inlets 125 thereby corresponds to the relative orientation of the inlets 125 of the mixing passages 121, 122, 123, 124 of the first static mixer 1.

Figure 77:
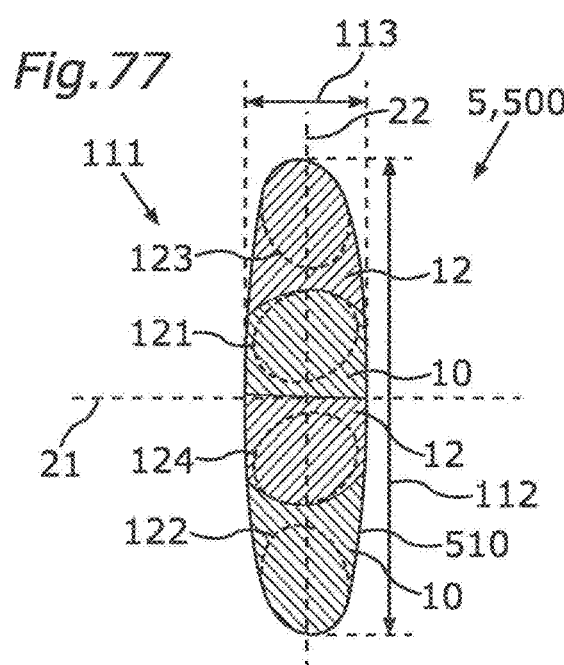
Figure 78:
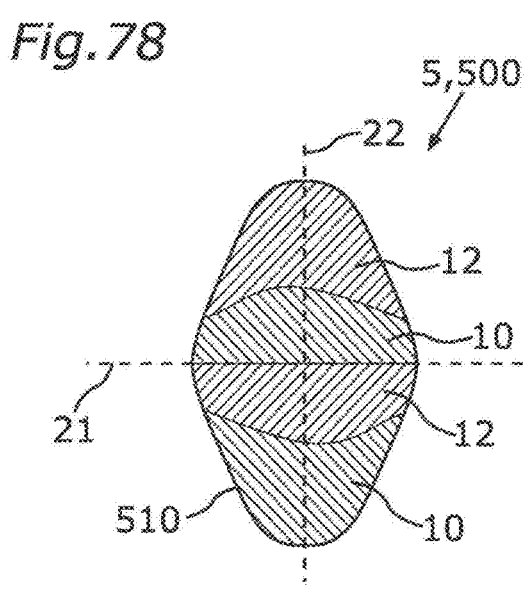
Figure 79:
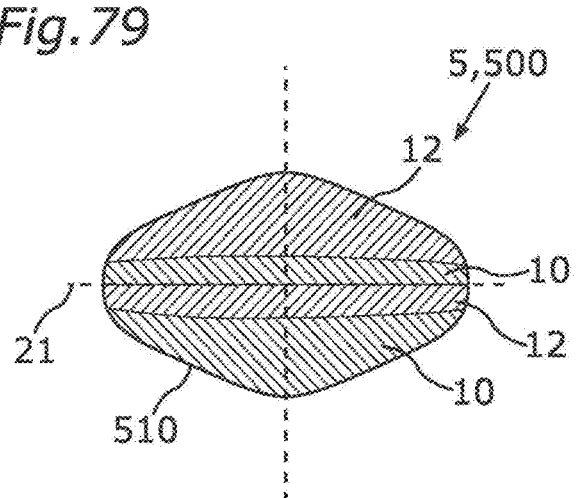
Figure 80:
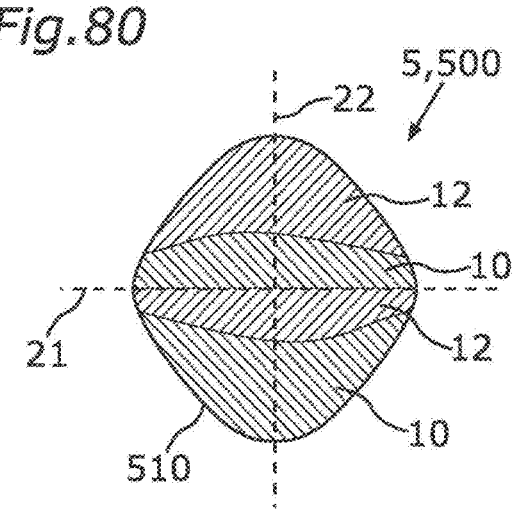

FIGS. 72 to 76 show cross-sections of the mixing passages 121, 122, 123, 124 of the inlet segment 530 at consecutive positions along the flow direction 25 and FIG. 77 shows the inlet 111 of the common distributor 510 of the first mixing segment 500 and the outlet arrangement of the mixing passages 121, 122, 123, 124.

The mixing passages 121, 122, 123, 124 become rearranged from their inlet arrangement shown in FIG. 71 to the outlet arrangement that is indicated in FIGS. 72 and 77 by dashed lines. The positions of the mixing passages 121, 122, 123, 124 of the fifth static mixer 5 become rearranged between the distributors 532, 510 in the same way as the relative positions of the mixing passages 121, 122, 123, 124 of the third static mixer 3. Thereby, the shapes of the individual cross-sections of the passages 121, 122, 123, 124 of the fifth static mixer 5 keep their shape, area and orientation during rearrangement. With regard to the fifth static mixer 5, this means that they remain elliptical with constant orientation during rearrangement.

FIGS. 77 to 81 show cross-sections of the common distributor 510 perpendicular to the longitudinal axis 20 at consecutive positions along the flow direction 25. The cross-section of the common distributor 510 continuously deforms from its inlet shape shown in FIG. 77 via intermediate shapes shown in FIGS. 78 to 80 into its outlet shape shown in FIG. 81.

Figures 81, 82:
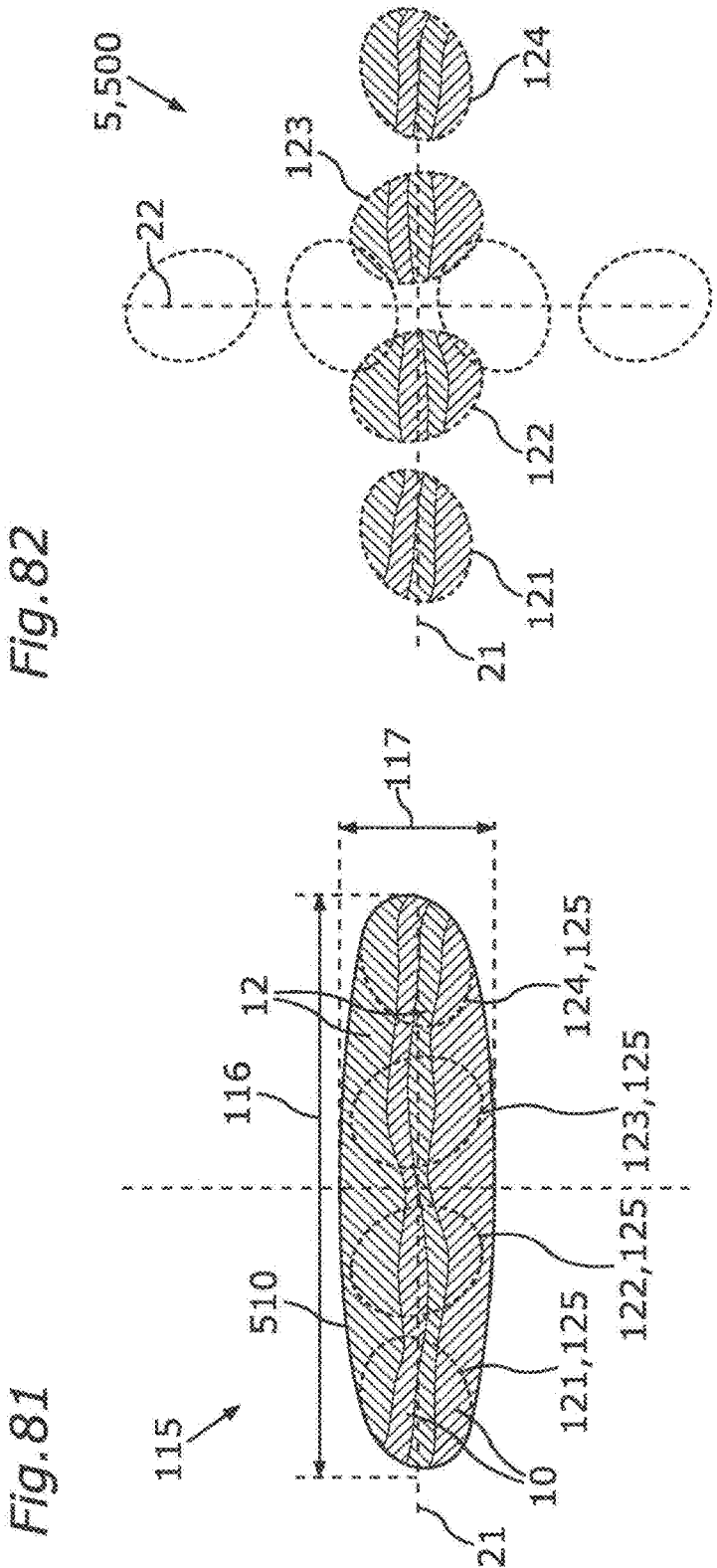

FIG. 82 shows a cross-section through the mixing passages 121, 122, 123, 124 of the mixing segment 500 at a downstream position behind the distributor 510 in the flow direction 25 with their outlet arrangement indicated by dashed lines. The rearrangement and deformation of the passages 121, 122, 123, 124 of the mixing segment 500 corresponds to the rearrangement and deformation of the passages 121, 122, 123, 124 of the inlet segment 530 shown in FIGS. 71 to 77.

The static mixers 1, 2, 3, 4, 5 constitute different embodiments of a static mixer according to the present disclosure. All these mixers 1, 2, 3, 4, 5 feature an inlet segment with an inlet distributor and four mixing passages, several mixing segments, each mixing segment having a common distributor followed by four mixing passages, and an outlet segment with an outlet collector.

The inlet segments of the first, second, third, fourth and fifth static mixer 1, 2, 3, 4, 5 are designated by reference numerals 130, 230, 330, 430 and 530, respectively, their mixing segments by reference numerals 100, 200, 300, 400 and 500, respectively. The outlet segments of the first, second, third, fourth and fifth static mixer 1, 2, 3, 4, 5 are designated by reference numerals 140, 240, 340, 440 and 540, respectively. All inlet segments 130, 230, 330, 430, 530 have the function to guide the unmixed material components 10, 12 to the first mixing segment 100, 200, 300, 400, 500 of the respective mixer 1, 2, 3, 4, 5 and all outlet segments 140, 240, 340, 440, 540 have the function to collect the mixed material components from the last mixing segment 100, 200, 300, 400, 500.

The inlet distributors of the first, second, third, fourth and fifth static mixer 1, 2, 3, 4, 5 are designated by reference numerals 132, 232, 332, 432 and 532, respectively, their common distributors by the reference numerals 110, 210, 310, 410 and 510, respectively, and their outlet collectors by reference numerals 142, 242, 342, 442 and 542, respectively. The first, second, third and fourth mixing passages of the inlet segments 130, 230, 330, 430, 530, as well as the first, second, third and fourth mixing passages of the mixing segments 100, 200, 300, 400, 500 of the individual mixers 1, 2, 3, 4, 5 are all designated by reference numerals 121, 122, 123 and 124, respectively. With each mixer 1, 2, 3, 4, 5, the individual mixing passages 121, 122, 123, 124 of the inlet segment 130, 230, 330, 430, 530 and the individual mixing passages 121, 122, 123, 124 of the mixing segments 100, 200, 300, 400, 500 each have the same shape and arrangement.

All remaining parts that the static mixers 1, 2, 3, 4, 5 of the present disclosure have in common and perform the same function are designated by the same reference numeral among the individual mixers 1, 2, 3, 4, 5, albeit these parts can have different shapes among the individual mixers 1, 2, 3, 4, 5.

With all mixers 1, 2, 3, 4, 5, the outlet arrangements of the passages 121, 122, 123, 124 of the individual mixers 1, 2, 3, 4, 5 shown in FIGS. 12, 29, 45, 61 and 77 are different from their respective inlet arrangement shown in FIGS. 17, 33, 49, 65 and 81.

With all static mixers 1, 2, 3, 4, 5, the ratio of the length 118 of the distributors 110, 210, 310, 410, 510 of the mixing segments 100, 200, 300, 400, 500 along the longitudinal axis 20 to the diameter 111, 116 of the distributor 110, 210, 310, 410, 510 perpendicular to the longitudinal axis 20 is selected in the range of 0.1 to 0.6.

With the second and fourth static mixer 2, 4, the ratio of the length 118 of the distributors 110, 210, 310, 410, 510 of the mixing segments 100, 200, 300, 400, 500 along the longitudinal axis 20 to the length 128 of each passage 121, 122, 123, 124 along the longitudinal axis 20 is selected in the range of 0.6 to 1.5.

With all static mixers 1, 2, 3, 4, 5, the inlets 125 of the passages 121, 122, 123, 124 are arranged within the inlet arrangements in the inlet sequences parallel to the first transverse axis 21 shown in FIGS. 17, 33, 49, 65 and 81 and the outlets 126 of the passages 121, 122, 123, 124 are arranged within the outlet arrangement in the outlet sequences parallel to the second transverse axis 22 shown in FIGS. 12, 29, 45, 61 and 77. Thereby, the second transverse axis 22 is different from the first transverse axis 21, namely perpendicular to the first transverse axis 21.

With all static mixers 1, 2, 3, 4, 5, the outlet sequences of the individual passages 121, 122, 123, 124 shown in FIGS. 12, 29, 45, 61 and 77 are non-identical permutations of their corresponding inlet sequences shown in FIGS. 17, 33, 49, 65 and 81, namely alternating permutations and derangements.

With all static mixers 1, 2, 3, 4, 5, the outlet sequences shown in FIGS. 12, 29, 45, 61 and 77 alternately comprise outlets 126 of passages 121, 122, 123, 124 having inlets 125 within a first half of the inlet sequences shown in FIGS. 17, 33, 49, 65 and 81 and outlets 126 of passages 121, 122, 123, 124 having inlets 125 within a second half of the inlet sequence.

As it is shown in FIGS. 12, 29, 45, 61 and 77, the distributors 110, 210, 310, 410, 510 of all static mixers 1, 2, 3, 4, 5 have elongated inlet shapes with orientations parallel to the first transverse axis 21. Furthermore, as shown in FIGS. 17, 33, 49, 65 and 81, the distributors 110, 210, 310, 410, 510 of all static mixers 1, 2, 3, 4, 5 have elongated outlet shapes with orientations parallel to the second transverse axis 22.

With all static mixers 1, 2, 3, 4, 5, the inlet lengths 112 of the inlet cross-sections of the distributors 110, 210, 310, 410, 510 equal the outlet lengths 116 of the outlet cross-sections of their distributors 110, 210, 310, 410, 510. Furthermore, with the first, second, fourth and fifth static mixer 1, 2, 4, 5, the inlet width 113 of the inlet cross-sections of the distributors 110, 210, 310, 410, 510 equal the outlet width 117 of their respective outlet cross-sections.

With the first, second, fourth and fifth static mixer 1, 2, 4, 5, the inlet shapes shown in FIGS. 12, 29, 45, 61 and 77 and the respective outlet shapes shown in FIGS. 17, 33, 49, 65 and 81 are identical and have a different orientation within a transverse plane perpendicular to the longitudinal axis 20. Thereby, the outlet shapes equal the inlet shapes upon a rotation by 90° around the longitudinal axis 20.

With all static mixers 1, 2, 3, 4, 5, the cross-sections of the individual distributors 110, 210, 310, 410, 510 perpendicular to the longitudinal axis 20 transform from their inlet shapes via intermediate shapes at intermediate longitudinal positions into their respective outlet shapes, the intermediate shapes of the individual distributors 110, 210, 310, 410, 510 being different from their respective inlet and outlet shapes.

With the third and fourth static mixer 3, 4, the cross-sectional shape of each of the passages 121, 122, 123, 124 perpendicular to the longitudinal axis 20 of the mixing segments 300, 400 is circular at at least one position along their longitudinal extent. With the fourth static mixer 4, the cross-sectional shape of each of the passages 121, 122, 123, 124 perpendicular to the longitudinal axis 20 of the mixing segments 400 is circular over their entire longitudinal extent.

With the first, third and fifth static mixer 1, 3, 5, the cross-sectional shape of each of the passages 121, 122, 123, 124 perpendicular to the respective axes of the individual passages 121, 122, 123, 124 is circular at at least one position along their longitudinal extent. With the first and fifths static mixer 1, 5, the cross-sectional shape of each of the passages 121, 122, 123, 124 perpendicular to the respective axes of the individual passages 121, 122, 123, 124 is circular over their entire longitudinal extent.

With the first, second, third and fifth static mixer 1, 2, 3, 5, the cross-sectional shape of each of the passages 121, 122, 123, 124 perpendicular to the longitudinal axis 20 of the mixing segments 100, 200, 300, 500 is non-circular, namely oval, at at least one position along their longitudinal extent. With the first, second, and fifth static mixer 1, 2, 5, the cross-sectional shape of each of the passages 121, 122, 123, 124 perpendicular to the longitudinal axis 20 of the mixing segments 100, 200, 500 is non-circular, namely oval, over their entire longitudinal extent. With the first and fifth static mixer 1, 5, the cross-sectional shape of each of the passages 121, 122, 123, 124 perpendicular to the longitudinal axis 20 of the mixing segments 100, 500 is elliptical over their entire longitudinal extent.

With the second, third and fourth static mixer 2, 3, 4, the cross-sectional shape of each of the passages 121, 122, 123, 124 perpendicular to the respective axes of the individual passages 121, 122, 123, 124 is non-circular, namely oval, at at least one position along their longitudinal extent. With the second and fourth static mixer 2, 4, the cross-sectional shape of each of the passages 121, 122, 123, 124 perpendicular to the respective axes of the individual passages 121, 122, 123, 124 is non-circular, namely oval, over their entire longitudinal extent.

With the first, fourth and fifth static mixer 1, 4, 5, the cross-sectional shape of each of the passages 121, 122, 123, 124 of the plurality of passages 121, 122, 123, 124 is constant over their longitudinal extent.

With the second and third static mixer 2, 3, the cross-sectional shape of each of the passages 121, 122, 123, 124 of the plurality of passages 121, 122, 123, 124 varies over their longitudinal extent.

With the first, second, fourth and fifth static mixer 1, 2, 4, 5, the cross-sectional area of each of the passages 121, 122, 123, 124 of the plurality of passages 121, 122, 123, 124 is constant over their longitudinal extent. With other embodiments of the first, second, fourth and fifth static mixer. 1, 2, 4, 5, the cross-sectional areas can also vary over the longitudinal extent of the individual passages 121, 122, 123, 124.

With all static mixers 1, 2, 3, 4, 5, each mixing segment 100, 200, 300, 400, 500 comprises four passages 121, 122, 123, 124.

Simulated mixing results for mixing a viscous material with a viscosity of 10 Pa s in laminar flow for the first, second, third, fourth and fifth mixer are the following. First static mixer 1: pressure drop of $\Delta p=2.42$ bar, coefficient of variation of mixing CoV=0.0028 and a waste of 4.54 ml; second static mixer 2: $\Delta p=0.86$ bar, CoV=0.0248 and a waste of 6.53 ml; third static mixer 3: $\Delta p=1.84$ bar, CoV=0.0262 and a waste of 3.77 ml; fourth static mixer 4: $\Delta p=2.92$ bar, CoV=0.0021 and a waste of 2.54 ml; fifth static mixer 5: $\Delta p=1.97$ bar, CoV=0.0049 and a waste of 3.62 ml. Further exemplary embodiments of static mixers according to the present disclosure are summarized in the following list of enumerated embodiments.

1. A static mixer (1, 2, 3, 4, 5) comprising two, three or more mixing segments (100, 200, 300, 400, 500), wherein each mixing segment (100, 200, 300, 400, 500) comprises an inlet section (101), an outlet section (102) oppositely disposed to the inlet section (101), a longitudinal axis (20) defined between the inlet section (101) and the outlet section (102), a plurality of mixing passages (121, 122, 123, 124) and a common distributor (110, 210, 310, 410, 510) connected to each of the plurality of mixing passages (121, 122, 123, 124) of said mixing segment (100, 200, 300, 400, 500), with the common distributor (110, 210, 310, 410, 510) being arranged at the inlet section (101), wherein a ratio of a length of the distributor (110, 210, 310, 410, 510) along the longitudinal axis (20) to a diameter of the distributor (110, 210, 310, 410, 510) perpendicular to the longitudinal axis (20) is selected in the range of 0.25 to 0.6.

2. A static mixer (1, 2, 3, 4, 5) in accordance with embodiment 1, wherein a ratio of the length of the distributor (110, 210, 310, 410, 510) to a length of each passage (121, 122, 123, 124) along the longitudinal axis (20) is selected in the range of 0.6 to 1.5.

3. A static mixer (1, 2, 3, 4, 5) in accordance with embodiment 1 or embodiment 2, wherein a cross-sectional shape of each of the passages (121, 122, 123, 124) of the plurality of passages (121, 122, 123, 124) is non-circular along the longitudinal axis (20).

4. A static mixer (1, 2, 3, 4, 5) in accordance with embodiment 3, wherein the cross-sectional shape of each of the passages (121, 122, 123, 124) of the plurality of passages (121, 122, 123, 124) is oval along the longitudinal axis (20).

5. A static mixer (1, 2, 3, 4, 5) in accordance with embodiment 3 or embodiment 4, wherein a size of the cross-sectional shape of each of the passages (121, 122, 123, 124) of the plurality of passages (121, 122, 123, 124) varies along a length of the plurality of passages (121, 122, 123, 124).

6. A static mixer (1, 2, 3, 4, 5) comprising two, three or more mixing segments (100, 200, 300, 400, 500), wherein each mixing segment (100, 200, 300, 400, 500) comprises an inlet section (101), an outlet section (102) oppositely disposed to the inlet section (101), a longitudinal axis (20) defined between the inlet section (101) and the outlet section (102), a plurality of mixing passages (121, 122, 123, 124) and a common distributor (110, 210, 310, 410, 510) connected to each of the plurality of mixing passages (121, 122, 123, 124) of said mixing segment (100, 200, 300, 400, 500), with the common distributor (110, 210, 310, 410, 510) being arranged at the inlet section (101), wherein a ratio of a length of the distributor (110, 210, 310, 410, 510) to a length of each passage (121, 122, 123, 124) along the longitudinal axis (20) is selected in the range of 0.6 to 1.5.

7. A static mixer (1, 2, 3, 4, 5) in accordance with embodiment 6, wherein a ratio of the length of the distributor (110, 210, 310, 410, 510) along the longitudinal axis (20) to diameter of the distributor (110, 210, 310, 410, 510) perpendicular to the longitudinal axis (20) is selected in the range of 0.25 to 0.6.

8. A static mixer (1, 2, 3, 4, 5) in accordance with embodiment 6 or embodiment 7, wherein a cross-sectional shape of each of the passages (121, 122, 123, 124) of the plurality of passages (121, 122, 123, 124) is non-circular along the longitudinal axis (20).

9. A static mixer (1, 2, 3, 4, 5) in accordance with embodiment 8, wherein the cross-sectional shape of each of the passages (121, 122, 123, 124) of the plurality of passages (121, 122, 123, 124) is oval along the longitudinal axis (20).

10. A static mixer (1, 2, 3, 4, 5) in accordance with embodiment 8 or embodiment 9, wherein a size of the cross-sectional shape of each of the passages (121, 122, 123, 124) of the plurality of passages (121, 122, 123, 124) varies along a length of the plurality of passages (121, 122, 123, 124).

11. A static mixer (1, 2, 3, 4, 5) comprising two, three or more mixing segments (100, 200, 300, 400, 500), wherein each mixing segment (100, 200, 300, 400, 500) comprises an inlet section (101), an outlet section (102) oppositely disposed to the inlet section (101), a longitudinal axis (20) defined between the inlet section (101) and the outlet section (102), a plurality of mixing passages (121, 122, 123, 124) and a common distributor (110, 210, 310, 410, 510) connected to each of the plurality of mixing passages (121, 122, 123, 124) of said mixing segment (100, 200, 300, 400, 500), with the common distributor (110, 210, 310, 410, 510) being arranged at the inlet section (101), wherein a cross-sectional shape of each of the passages (121, 122, 123, 124) of the plurality of passages (121, 122, 123, 124) is non-circular along the longitudinal axis (20).

12. A static mixer (1, 2, 3, 4, 5) in accordance with embodiment 11, wherein the cross-sectional shape of each of the passages (121, 122, 123, 124) of the plurality of passages (121, 122, 123, 124) is oval along the longitudinal axis (20).

13. A static mixer (1, 2, 3, 4, 5) in accordance with embodiment 11 or embodiment 12, wherein a size of the cross-sectional shape of each of the passages (121, 122, 123, 124) of the plurality of passages (121, 122, 123, 124) varies along a length of the plurality of passages (121, 122, 123, 124).

14. A static mixer (1, 2, 3, 4, 5) in accordance with one of embodiments 11 to 13, wherein a ratio of the length of the distributor (110, 210, 310, 410, 510) to a length of each passage (121, 122, 123, 124) along the longitudinal axis (20) is selected in the range of 0.6 to 1.5.

15. A static mixer (1, 2, 3, 4, 5) in accordance with one of embodiments 11 to 14, wherein a ratio of the length of the distributor (110, 210, 310, 410, 510) along the longitudinal axis (20) to diameter of the distributor (110, 210, 310, 410, 510) perpendicular to the longitudinal axis (20) is selected in the range of 0.25 to 0.6.

16. A static mixer (1, 2, 3, 4, 5) in accordance with at least one of the preceding embodiments, wherein the two, three or more mixing segments (100, 200, 300, 400, 500) are integrally formed and connected to one another as one piece.

17. A static mixer (1, 2, 3, 4, 5) in accordance with at least one of the preceding embodiments, wherein the static mixer (1, 2, 3, 4, 5) is made of metal.

18. A static mixer (1, 2, 3, 4, 5) in accordance with at least one of the preceding embodiments, wherein the static mixer (1, 2, 3, 4, 5) is made of plastic.

19. A static mixer (1, 2, 3, 4, 5) in accordance with at least one of the preceding embodiments, wherein the static mixer (1, 2, 3, 4, 5) is formed by 3D printing.

20. A static mixer (1, 2, 3, 4, 5) in accordance with embodiment 19, wherein the 3D printing method comprises the VAT photopolymerization method and/or the Powder Bed method.

21. A static mixer (1, 2, 3, 4, 5) in accordance with at least one of the preceding embodiments, wherein each segment (100, 200, 300, 400, 500) comprises four passages (121, 122, 123, 124).

22. A static mixer (1, 2, 3, 4, 5) in accordance with at least one of the preceding embodiments, wherein each passage (121, 122, 123, 124) is closed along a length thereof 23. A static mixer (1, 2, 3, 4, 5) in accordance with at least one of the preceding embodiments, wherein outlet sections (102) of some of the two, three or more mixing segments (100, 200, 300, 400, 500) are connected to the inlet section (101) of the directly adjacent mixing segment (100, 200, 300, 400, 500).

25. A static mixer (1, 2, 3, 4, 5) in accordance with at least one of the preceding embodiments, wherein the outlet section (102) of one mixing segment (100, 200, 300, 400, 500) is connected to the outlet from the static mixer (1, 2, 3, 4, 5).

The invention claimed is:

1. A static mixer comprising:
two or more mixing segments,
each mixing segment of the two or more mixing segments including an inlet section, an outlet section oppositely disposed to the inlet section, a longitudinal axis defined between the inlet section and the outlet section, a plurality of mixing passages, and
a common distributor connected to each of the plurality of mixing passages for each mixing segment,
the common distributor arranged at the inlet section,
the inlet section for each of the plurality of mixing passages forms an inlet arrangement at the common distributor of a corresponding mixing segment, and
the outlet section for each of the plurality of mixing passages forms an outlet arrangement at the outlet section of a corresponding mixing segment,
the outlet arrangement being different from the inlet arrangement,
each of the common distributors having an inlet and an outlet located opposite from the inlet along the longitudinal axis,
an inlet cross-section at the inlet that having an elongated inlet shape with an orientation parallel to a first transverse axis and an outlet cross-section at the outlet that has an elongated outlet shape with an orientation parallel to a second transverse axis, and
the first transverse axis being different from the second transverse axis.

2. The static mixer in accordance with claim 1, wherein a ratio of a length of the common distributor of at least one mixing segment of the plurality of mixing segments along the longitudinal axis to a maximum extent of the common distributor perpendicular to the longitudinal axis over an entire length is selected in the range of 0.1 to 0.6, or
a ratio of the length of the common distributor of at least one mixing segment of the plurality of mixing segments along the longitudinal axis to a length of each passage along the longitudinal axis is selected in the range of 0.6 to 1.5.

3. The static mixer in accordance with claim 1, wherein the inlets of the plurality of mixing passages are arranged in an inlet sequence parallel to a first transverse axis within the inlet arrangement,
the outlets of the plurality of mixing passages are arranged in an outlet sequence parallel to a second transverse axis within the outlet arrangement, and the second transverse axis is different from the first transverse axis.

4. The static mixer in accordance with claim 3, wherein the outlet sequence is a non-identical permutation of the inlet sequence.

5. The static mixer in accordance with claim 4, wherein the outlet sequence is an alternating permutation or a derangement of the inlet sequence.

6. The static mixer in accordance with claim 3, wherein the outlet sequence alternately comprises outlets of the plurality of mixing passages having inlets within a first half of the inlet sequence and outlets of the plurality of mixing passages having inlets within a second half of the inlet sequence.

7. The static mixer in accordance with claim 3, wherein the second transverse axis is perpendicular to the first transverse axis.

8. The static mixer in accordance with claim 1, wherein the inlet cross-section for each of the common distributors has an inlet length parallel to the first transverse axis and an inlet width perpendicular to the first transverse axis,
the outlet cross-section has an outlet length parallel to the second transverse axis and an outlet width perpendicular to the second transverse axis, and
the inlet length equals the outlet length or the inlet width equals the outlet width.

9. The static mixer in accordance with claim 1, wherein the inlet shape and the outlet shape are identical and have a different orientation within a transverse plane perpendicular to the longitudinal axis.

10. A static mixer comprising:
two or more mixing segments,
each mixing segment of the two or more mixing segments including an inlet section, an outlet section oppositely disposed to the inlet section, a longitudinal axis defined between the inlet section and the outlet section, a plurality of mixing passages, and
a common distributor connected to each of the plurality of mixing passages for each mixing segment,
the common distributor arranged at the inlet section,
the inlet section for each of the plurality of mixing passages forms an inlet arrangement at the common distributor of a corresponding mixing segment, and
the outlet section for each of the plurality of mixing passages forms an outlet arrangement at the outlet section of a corresponding mixing segment,
the outlet arrangement being different from the inlet arrangement,
a cross-section of each of the common distributors perpendicular to the longitudinal axis transforming from the inlet shape via an intermediate shape at an intermediate longitudinal position in between the inlet and the outlet to the outlet shape,
the intermediate shape being different from the inlet shape or outlet shape.

11. The static mixer in accordance with claim 1, wherein a cross-sectional shape of each of the plurality of mixing passages perpendicular to the longitudinal axis of the two or more mixing segments or perpendicular to a respective axes of each of the plurality of mixing passages is circular at at least one position along a longitudinal extent.

12. The static mixer in accordance with claim 1, wherein a cross-sectional shape of each of the plurality of mixing passages perpendicular to the longitudinal axis of the two or more mixing segments or perpendicular to a respective axes of each of the plurality of mixing passages is non-circular at at least one position along a longitudinal extent.

13. The static mixer in accordance with claim 1, wherein a cross-sectional shape of each of the plurality of mixing passages is constant over a longitudinal extent.

14. The static mixer in accordance with claim 1, wherein a cross-sectional shape of each of the plurality of mixing passages varies over a longitudinal extent.

15. The static mixer in accordance with claim 1, wherein a cross-sectional area of each of the plurality of mixing passages is constant over a longitudinal extent.

16. The static mixer in accordance with claim 1, wherein each mixing segment of the plurality of mixing segments comprises three or more passages.

17. The static mixer in accordance with claim 1, wherein the first transverse axis is perpendicular to the second transverse axis.

18. The static mixer in accordance with claim 1, wherein a cross-sectional shape of each of the plurality of mixing passages perpendicular to the longitudinal axis of the two or more mixing segments or perpendicular to a respective axes of each of the plurality of mixing passages is circular at at least one position along an entire longitudinal extent.

19. The static mixer in accordance with claim 1, wherein a cross-sectional shape of each of the plurality of mixing passages perpendicular to the longitudinal axis of the two or more mixing segments or perpendicular to a respective axes of each of the plurality of mixing passages is non-circular at at least one position along an entire longitudinal extent.

\*    \*    \*    \*    \*